(12) United States Patent
Moorsom et al.

(10) Patent No.: US 12,445,573 B2
(45) Date of Patent: Oct. 14, 2025

(54) SYSTEM AND METHOD FOR ANALYSIS AND OPTIMIZATION OF VIDEO CONFERENCING

(71) Applicant: Neuroscaping Design Inc., Toronto (CA)

(72) Inventors: D. Bennett Moorsom, Etobicoke (CA); Ali Hussein, Cambridge, MA (US)

(73) Assignee: Neuroscaping Design Inc., Toronto (CA)

( * ) Notice: Subject to any disclaimer, the term of this patent is extended or adjusted under 35 U.S.C. 154(b) by 190 days.

(21) Appl. No.: 17/993,472

(22) Filed: Nov. 23, 2022

(65) Prior Publication Data

US 2023/0162733 A1 May 25, 2023

Related U.S. Application Data

(60) Provisional application No. 63/282,858, filed on Nov. 24, 2021, provisional application No. 63/282,863, (Continued)

(51) Int. Cl.
| | |
|---|---|
| *H04N 7/15* | (2006.01) |
| *G06V 40/20* | (2022.01) |
| *G10L 15/22* | (2006.01) |
| *G10L 25/57* | (2013.01) |
| *H04L 12/18* | (2006.01) |
| *H04N 7/14* | (2006.01) |

(52) U.S. Cl.
CPC ........... *H04N 7/15* (2013.01); *G06V 40/28* (2022.01); *G10L 15/22* (2013.01); *G10L 25/57* (2013.01); *H04L 12/1827* (2013.01); *H04N 7/14* (2013.01); *H04N 7/155* (2013.01)

(58) Field of Classification Search
None
See application file for complete search history.

(56) References Cited

U.S. PATENT DOCUMENTS

| 10,827,070 B1 | 11/2020 | Veloso et al. | |
| 2007/0116207 A1 * | 5/2007 | Brunson | G09B 7/02 379/90.01 |

(Continued)

OTHER PUBLICATIONS

International Search Report from corresponding PCT application, PCT/US2022/080420.

*Primary Examiner* — Quoc D Tran
(74) *Attorney, Agent, or Firm* — Stratford Group Ltd.

(57) ABSTRACT

The invention described herein relates to communication, and in particular systems and methods for understanding how communication is being received and providing real-time behavioral feedback to understand how the communication is being received, so that quantitative analysis can be done to determine KPI for optimizing video call presentations. Disclosed is a communication guidance system comprising: a non-transitory computer-readable medium; an input recognition interface; and processing circuitry operably connected to the non-transitory computer-readable medium and the input recognition interface, the processing circuitry being configured to perform the following tasks: perform an analysis of audio and video data from a user and a receiver; analyze, based on historical data, the user's communication quality; and provide feedback based on the analysis.

10 Claims, 21 Drawing Sheets

Related U.S. Application Data filed on Nov. 24, 2021, provisional application No. 63/282,866, filed on Nov. 24, 2021, provisional application No. 63/282,871, filed on Nov. 24, 2021, provisional application No. 63/284,301, filed on Nov. 30, 2021, provisional application No. 63/284,308, filed on Nov. 30, 2021, provisional application No. 63/284,322, filed on Nov. 30, 2021, provisional application No. 63/284,336, filed on Nov. 30, 2021.

(56) References Cited

U.S. PATENT DOCUMENTS

| | | | | |
|---|---|---|---|---|
| 2016/0117624 | A1* | 4/2016 | Flores | H04L 67/306 |
| | | | | 705/7.39 |
| 2016/0283816 | A1* | 9/2016 | Paradkar | G06V 10/426 |
| 2017/0116552 | A1* | 4/2017 | Deodhar | G06Q 10/0639 |
| 2018/0082262 | A1* | 3/2018 | Kathuria | G06Q 10/06393 |
| 2020/0076634 | A1* | 3/2020 | Akolkar | H04L 12/1818 |
| 2020/0265483 | A1 | 8/2020 | Tortoriello et al. | |
| 2022/0147892 | A1 | 5/2022 | Zeng et al. | |
| 2022/0400022 | A1* | 12/2022 | Desai | G06V 40/107 |
| 2022/0405630 | A1* | 12/2022 | Harrison | G06Q 10/0639 |
| 2023/0080660 | A1* | 3/2023 | Miletic | G10L 15/063 |
| | | | | 382/103 |
| 2023/0134143 | A1* | 5/2023 | Chau | H04N 7/147 |
| | | | | 709/204 |

\* cited by examiner

SYSTEM AND METHOD FOR ANALYSIS AND OPTIMIZATION OF VIDEO CONFERENCING

CROSS-REFERENCE TO RELATED APPLICATIONS

This application claims the benefit of U.S. Provisional Patent Applications Nos. 63/282,858, 63/282,863, 63/282,866, and 63/282,871, which were filed on Nov. 24, 2021, and Nos. 63/284,301, 63/284,308, 63/284,322, and 63/284,336, which were filed on Nov. 30, 2021, all of which are incorporated herein by reference in their entirety.

BACKGROUND OF THE INVENTION

Field of the Invention

The disclosure relates to communication, relates to communication, and in particular, systems and methods for understanding how communication is being received and providing real-time behavioral feedback to understand how the communication is being received, so that quantitative analysis can be done to determine KPI for optimizing video call presentations.

Background

As more and more meetings are being held via online video communication, some of the typical non-verbal means of communicating are hampered as a result of limited insight, lack of physical presence or view of each participant. This can further be diminished by the quality of audio-visual equipment as well as internet speed and processing. However, as a result of communicating via video conferencing additional data can be tracked and done so in real-time, which can not only help offset some of the limitations of non-verbal communication, but provide advancements and greater insights into how the communication is being received. This can be done using previously untracked and analyzed metrics with machine learning and artificial intelligence; thus, resulting in improved communication. The tracking/analysis of the metrics can result in personalized feedback to the presenter, thus providing immediate feedback to improve the communication between the recipient and presenter. To better understand how messaging is received and responded to. Providing solutions to this and other problems will become apparent through the description and embodiments provided below.

As these new metrics are tracked, a system and method of updating the accuracy and relevancy of those metrics is also required. In particular, generating key performance indicators (KPIs) and understanding how those KPIs can optimize video call presentations.

SUMMARY

Using a Communication Guidance System for Identification of Talking Points During a Video Conference Call In one embodiment, a communication guidance system is used to set up talking points that will be used by a presenter to communicate and efficiently present material in an organized and efficient manner In another embodiment, the communication guidance system comprises a non-transitory computer-readable medium, an input recognition interface; and processing circuitry operably connected to the non-transitory computer-readable medium and the input recognition interface, the processing circuitry being configured to perform the tasks of receiving one or more talking points; analyze speech from a user or receiver, identifying if any of the speech correlates to the one or more talking points; and modifying the one or more talking points in a manner that is indicative of the talking point being discussed.

In another embodiment, the processing circuitry can further analyze a completed video conference in view of the one or more talking points and perform an analysis to determine at least one of the following: the order each talking point was presented, the amount of time spent discussing each talking point, and feedback received from the receiver regarding each talking point.

In another embodiment, a talking point tracking method during a video conference call comprises the steps of receiving one or more talking points into a communication guidance system, sorting and displaying the talking points during a video conference call; analyzing the speech of all parties participating in the video conference, calling to determine if any of the one or more talking points were mentioned; and updating the display of the one or more talking points based on the analysis of the speech.

In another embodiment, the talking point tracking method further comprising the step of pre-processing the one or more talking points using a natural processing language algorithm.

In another embodiment, the talking point tracking method further comprising the step of analyzing a completed video conference call in view of the one or more talking points and perform an analysis to determine at least one of the following: the order each talking point was presented, the amount of time spent discussing each talking point, and feedback received from the receiver regarding each talking point.

Using a Communication Guidance System for Pre-Call Analysis of A Video Conference Call In another embodiment, a communication guidance system is used to perform several pre-call analyses of various aspects related to the way a presenter communicates information. Some of these analyses include consistency in voice levels, appropriate inflections, appropriate gestures, timing on content, recognition of receiver's verbal and non-verbal feedback and many other aspects.

In another embodiment, a communication guidance system, comprises a non-transitory computer-readable medium, an input recognition interface; and processing circuitry operably connected to the non-transitory computer-readable medium and the input recognition interface, the processing circuitry being configured to analyze both audio and video data from a user and receiver; determine based on a predetermined objectives an assessment of the user achieving the objectives; and provide a recommendation for improvement based on the assessment.

In another embodiment, the recommendation can include any of: changing the cadence of speech, monitoring appropriate gestures, displaying content at appropriate times, modifying camera or audio equipment, updating background or lighting, and identifying opportunities to allow the receiver to provide additional input.

Using a Communication Guidance System for Post-Call Analysis of a Video Conference Call In another embodiment, the communication guidance system is used to perform several post-call analyses of various aspects related to the way a presenter communicates information. Some of these analyses include consistency in voice levels, appropriate inflections, appropriate gestures, timing on content, recognition of receiver's verbal and non-verbal feedback and many other aspects.

In another embodiment, a method of analyzing a presentation is disclosed comprising the steps of: recording audio and visual data for both the presenter and recipient associated with the presentation each time the presentation was presented and analyzing the audio and visual data received based on predetermined objectives to determine the extent the predetermined objectives were met.

In another embodiment, the method of analyzing a presentation further comprises the step of sorting the audio and video data by region or territory.

In another embodiment, the method of analyzing a presentation further comprises the step of comparing aggregated analyzed audio and video data associated with each region or territory to each region or territory.

In another embodiment, the method of analyzing a presentation further comprises the step of modifying the presentation for any region or territory that is a statistically significant range lower than a predetermined threshold.

In another embodiment, the statistically significant range of the method of analyzing a presentation is at least one standard deviation away from the predetermined threshold.

Using a Communication Guidance System for Measuring a Return on Investment

In another embodiment, the communication guidance system comprises: a non-transitory computer-readable medium; an input recognition interface; and processing circuitry operably connected to the non-transitory computer-readable medium and the input recognition interface, the processing circuitry being configured to perform the tasks of analyzing both audio and video data from a user and receiver; determining based on predetermined objectives an assessment of the user achieving the objectives; and providing a recommendation for improvement based on the assessment.

In another embodiment, the communication guidance system recommendation can include one or more of: changing the cadence of speech, monitoring appropriate gestures, displaying content at appropriate times, modifying camera or audio equipment, updating background or lighting, and identifying opportunities to allow the receiver to provide additional input.

In another embodiment, a talking point tracking method comprises the steps of: receiving one or more talking points into a communication guidance system; sorting and displaying the talking points during a video conference call; analyzing the speech of all parties participating in the video conference call to determine if any of the one or more talking points were mentioned; and updating the display of the one or more talking points based on the analysis of the speech.

In another embodiment a method of determining ROI for a sales team is disclosed, comprising the steps of comprises the steps of: recording audio and visual data from each video-conference sales call using a communication guidance system; receiving CRM data; analyzing the audio and visual data in view of the CRM data to build a profile associated with each recipient of each video-conference sales call; identifying in each recorded video-conference sales moments of concern and moments of achievement; developing demographic data based on the profiles generated and associating both the moments of concerns and moments of achievement with the demographic data; associating sales data to the demographic data; comparing the sales data against the moments of achievement data for at least one demographic area of the demographic data; determining the sales team associated with the compared sales data; and comparing the determined sales team and their costs against average sales data across each demographic area.

In another embodiment, method of determining ROI for a sales team further comprises using identified moments of concern and moments of achievement information in conjunction with sales data for a particular demographic to determine estimated costs associated with launching a new product to the particular demographic.

System and Method of Updating a Communication Guidance System

In another embodiment, a method of updating a communication guidance system comprising the steps of recording audio and visual data from each video-conference sales call using a communication guidance system; analyzing the audio and visual data in view of a baseline behavioral database of each recipient of each video-conference sales call to determine behavioral indicators; comparing sales data associated with each recipient with the behavioral indicators; and updating the baseline behavioral database based on the compared sales data and behavioral indicators.

In another embodiment, a method of updating a communication guidance system further comprising the step of gathering sales representative notes associated with a video-conference sales call and using that information to update the baseline behavioral database.

In another embodiment, a method of updating a communication guidance system further comprising the step of gathering recipient sales representative notes associated with a video-conference sales call and using those notes to build an individual profile associated with each of the one or more recipients and using each of the individual profiles to update the baseline behavioral database.

System and Database for Generating Behavioral Recommendations

In another embodiment, a method of recommending industry tools to be used comprises the steps of receiving an input regarding one or more desired behavioral outcomes; analyzing the input using a Levers and Lenses Taxonomy framework, wherein the Levers are indicative of industry tools and the Lenses are indicative of cognitive factors that affect engagement, and wherein the framework is validated using a plurality of recorded video-conference presentations sorted by industry, to confirm or update the associated Levers or Lenses used during the particular video-conference presentation, and further developing a weighting algorithm to validate the remaining Lenses and Levers identified in the framework, which have yet to be validated by a recorded video-conference presentation.

System and Method for Providing Video Call Optimization Recommendations and Sales Team Optimization In another embodiment, a method of generating one or more key performance indicators and recommending action items based on the one or more key performance indicators comprising the steps of generating industry-specific insights using a design recommendation engine that compares up-to-date journal research with a cognitive resonance framework that includes a database of levers representative of industry tools and lenses representative of cognitive factors that affect engagement, generating using a communication guidance system post-call analytic and insight information based on recorded audio and visual data from a plurality of video-conference presentations, analyzing the post-call analytic and insight information in view of the industry-specific insights to generate one or more key performance indicators related to a query from a user; and generating a recommendation based on the one or more key performance indicators.

System and Method of Real-Time Behavioral Feedback

Contemplated herein is the system and method for providing real-time feedback (and guidance prompts) during a live video conference meeting. Some of the feedback is generated from the machine learning analysis of the variables including; attention analysis, voice attributes, body positioning, eye engagement, and behavior analysis. Each one of the forms of feedback can be guided through moments of anomalous performance with feedback during the live video conference call in the form of color indicators, scales, graphs, percentages or other numbers.

As the purveyor engages with the recipient, the recipient's feedback in the form of non-verbal and verbal communication is monitored and analyzed to provide various indicators about the level of engagement from the recipient.

DETAILED DESCRIPTION

Using a Communication Guidance System for Identification of Talking Points During a Video Conference Call This disclosure relates generally to a communication guidance system and associated methods which are designed to receive, track and analyze talking points during live or recorded video meeting presentations. This application focuses on this and other potential pre-call analysis tasks to aid a user in improving their communication skills and overall presentation.

One of the objectives of any meeting is to attempt to convey a list of items to be discussed. These items can be referred to as 'talking points.' In order to assess and assist whether those talking points were conveyed during a given call, a platform is contemplated herein that can be run as an app or through a browser. This platform can be configured to receive each of the talking points the user or presenter desires to address during a video conference and store those in memory. As the video conference is commencing, the platform can display the talking points or a reference indicator, such as numbers or letters of each talking point and highlight the talking point that has been identified. The identification of the talking points can be accomplished using a natural language processing engine.

Figure 1:
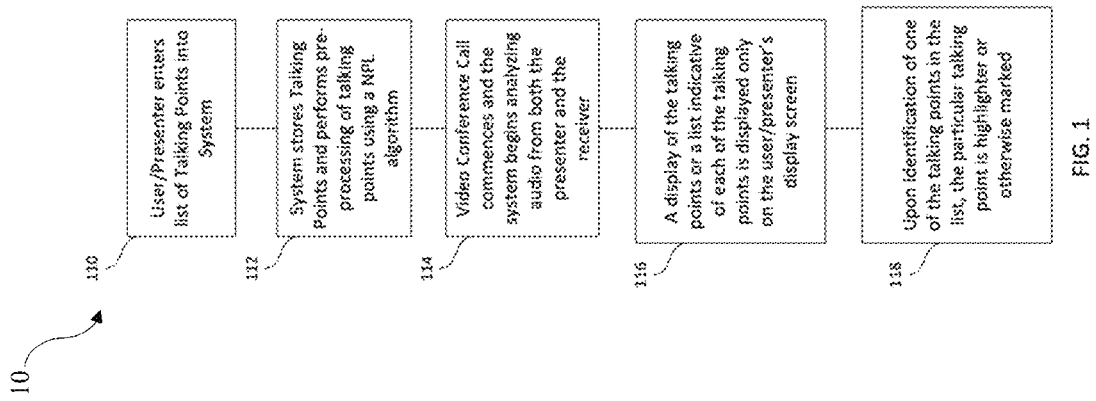
FIG. 1 illustrates a flowchart of one methodology which uses a communication guidance system for identifying talking points.

FIG. 1 illustrates a flowchart 10 of one methodology of using a communication guidance system for identifying talking points. In step 110, the user or presenter can enter the list of talking points into the system and even order those talking points to display in a particular manner. The user/presenter can also select the style of displaying the talking points as well as the style associated with once a talking point has been accomplished. The system then in step 112 stores the talking points in a database and can optionally perform a pre-processing analysis of the talking points using a text recognition and natural processing language algorithm. For example, the system may prompt the user to verbally read each of the talking points to match that particular user's voice to the entered talking points, which can allow the system to run more efficiently and accurately. If the user is aware of a previous instance where the receiver had been part of a previously recorded presentation then additional NLP analysis of the user will be done to update the algorithm for the upcoming presentation, again to efficiently and accurately identify the talking points as they are identified or discussed from the receiver's end.

Once the talking points are entered into the system and analyzed based on the identified user and receiver on the upcoming video conference call, the talking points can then be displayed in step 116 during the actual video conference call. As the system 114 identifies each of the talking points the system can then mark the displayed talking points of having been accomplished in the style the user designated.

Figure 2:
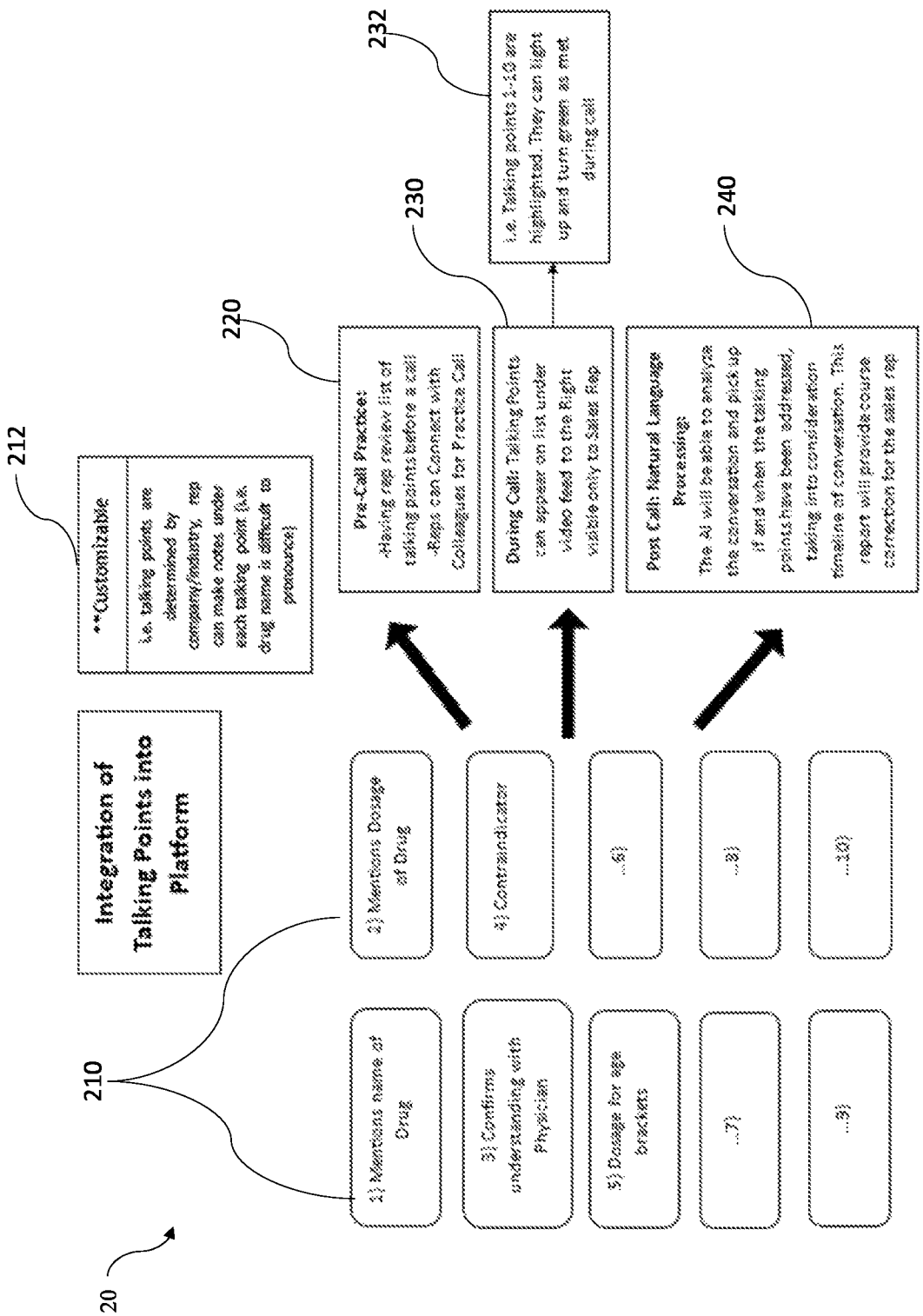
FIG. 2 illustrates a schematic of integrating talking points into a communication guidance system.

FIG. 2 illustrates a schematic 20 of integrating talking points 210 into a communication guidance system. As noted above, these talking points can be customizable 212 based on the particular presentation to be held and determined by user and/or customer input. They can also be imported from a list of talking points from a previous presentation where certain talking points were not discussed. These talking points can be used as part of a pre-call practice 220, where they are displayed, and the user runs through the presentation with for example a colleague. During the pre-call, the system can again identify when each of the talking points have been accomplished. As noted above, 230 shows how the talking points can be used during the video conference call and how they are highlighted in 232. After the call is accomplished, additional post-call analysis 240 can be performed to further analyze each of the discussed talking points. For example, at what point in the conversation were certain talking points introduced, the order they were introduced, the time spent on each talking point, the amount of commentary, questions, or attention each talking point received from the receiver of the presentation, and other analytics.

Figure 3:
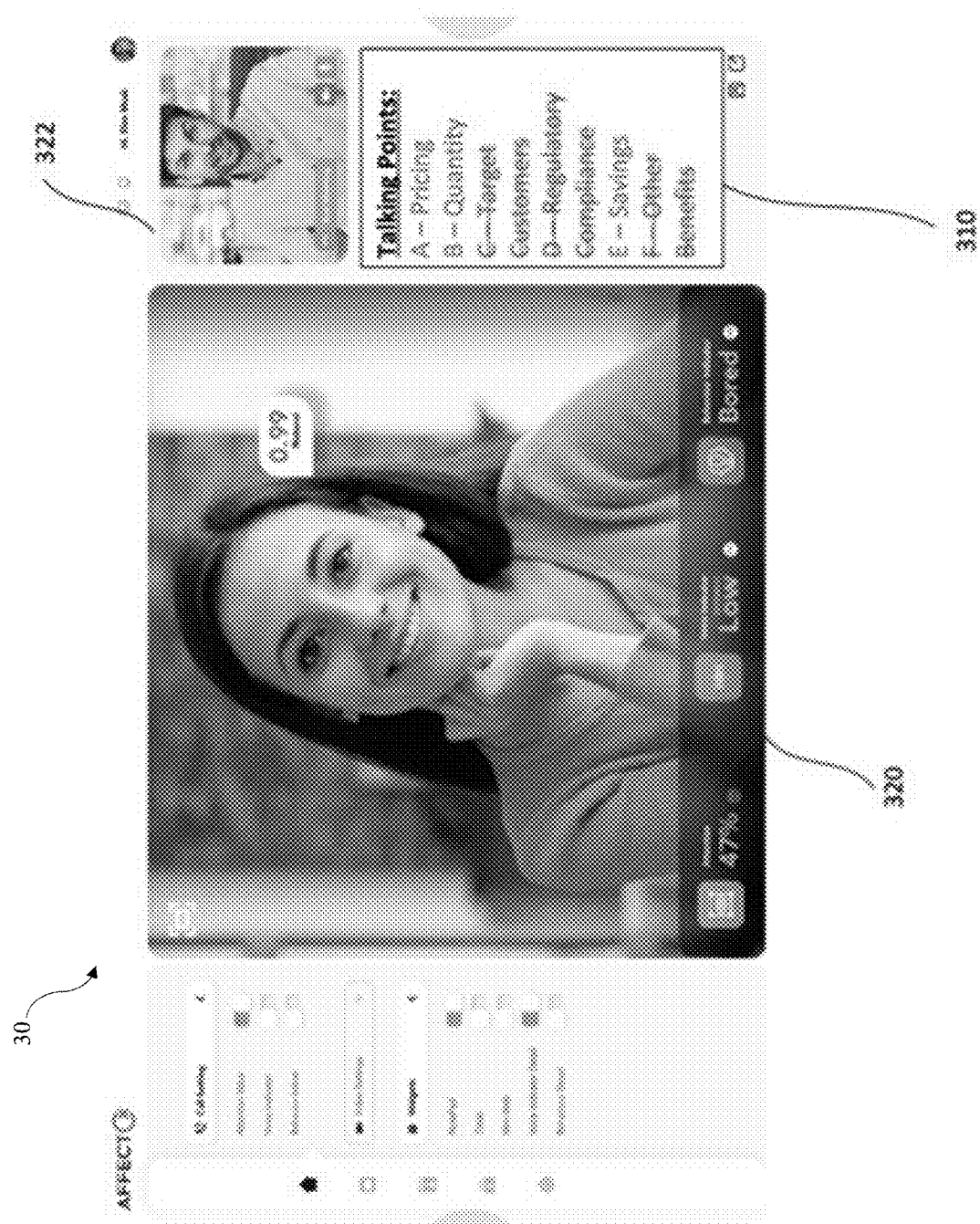
FIG. 3 illustrates an example of a screenshot of the Communication Guidance system monitoring and tracking talking points.

FIG. 3 illustrates an example of a screenshot 30 of the Communication Guidance system monitoring and tracking talking points. A display 320 of the person receiving the presentation can be the main focal point of the display, with the user/presenter display 322 positioned in a smaller less focal spot of the entire display. The talking points 310 can be positioned or re-positioned in various areas on the display, as shown they are off to the right side. As shown, a variety of styles can be imported to identify when a talking point has been accomplished. For example, and as shown, the text can appear in red if the points have not been discussed, as opposed to green for those that have. Those talking points that have been discussed can also be stricken through or removed altogether.

Figure 4:
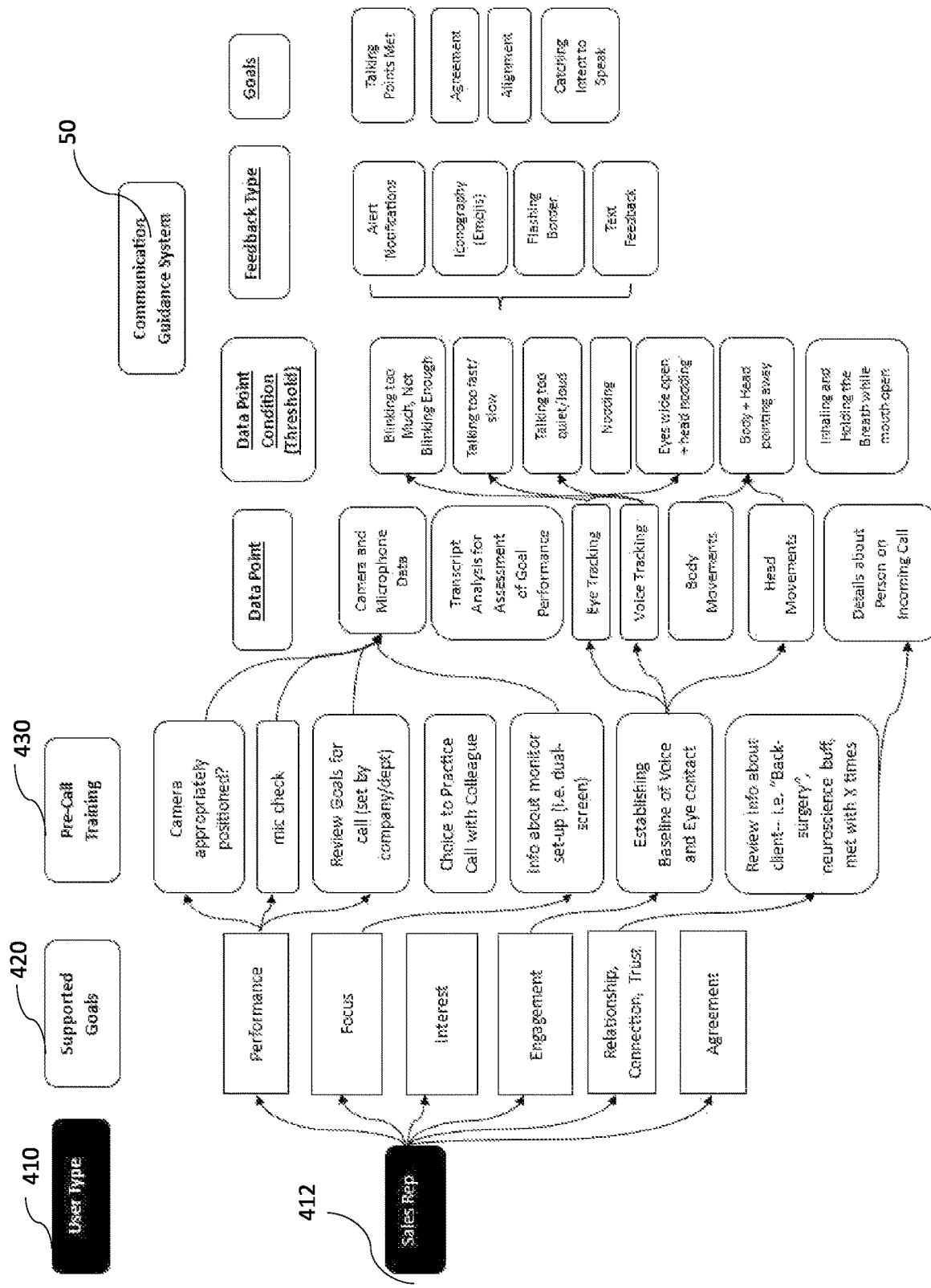
FIG. 4 illustrates an overall schematic of a methodology that can support proposed goals through pre-call analysis utilizing a communication guidance system.
Figure 6:
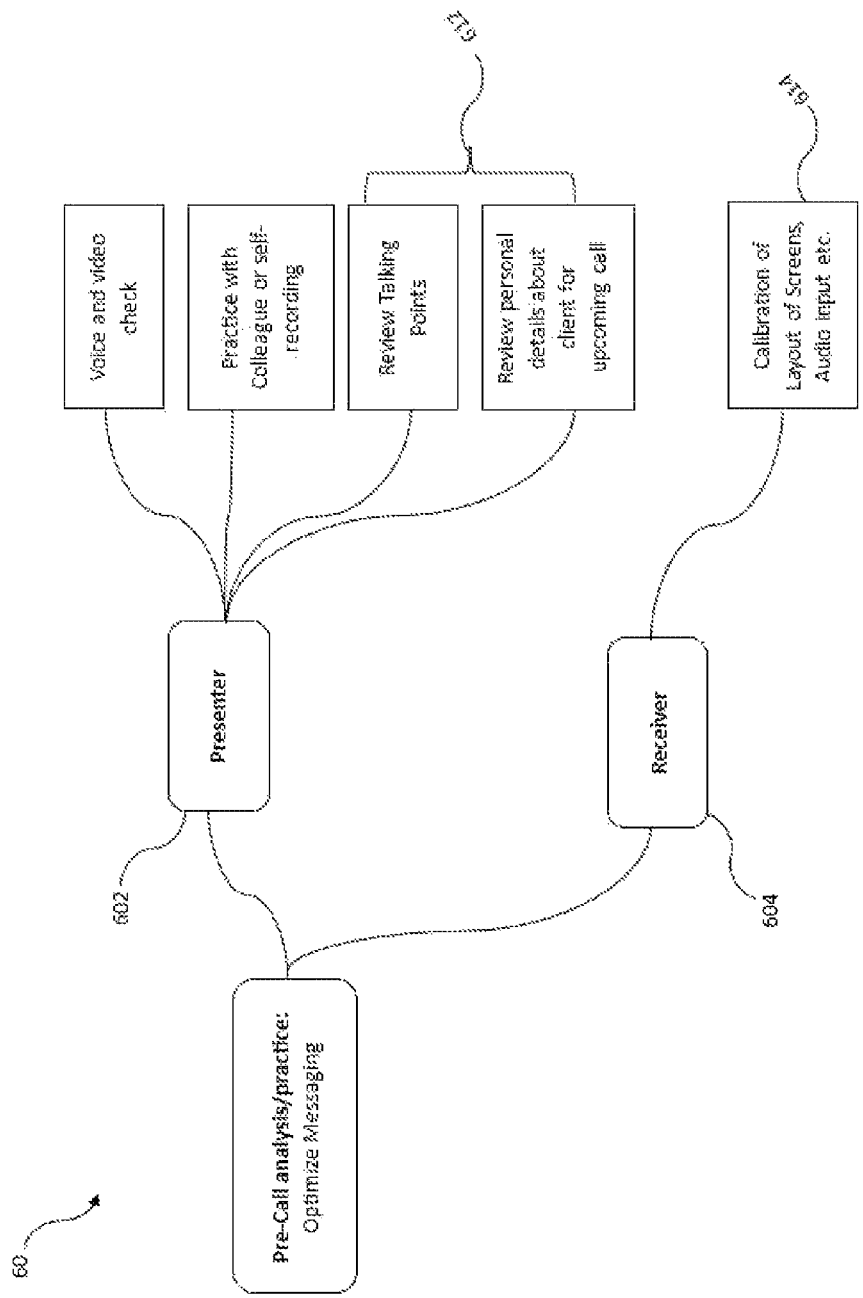
FIG. 6 illustrates a schematic of some objectives to be achieved during a practice video conference presentation.

Using a Communication Guidance System for Pre-Call Analysis of A Video Conference Call FIG. 4 illustrates an overall schematic 40 of how a methodology can support proposed goals 420 through pre-call analysis 430 and by utilizing a communication guidance system 50. As shown, the far-left column 410 depicts several user types including sales rep 412. Other user types will become apparent in other applications that build and relate to this application. As a sales representative 412, one often has several goals or objectives that are trying to be achieved. Listed are a sampling of some of these objectives including performance, focus, interest, engagement, relationship, connection, trust, and agreement. The pre-call training and analysis portion of the communication guidance system can help to improve and ultimately achieve these set out objectives. In one basic example, the sales rep 412 practices a presentation with a colleague, such as the one shown in schematic 60 in FIG. 6.

Referring back to column 430, in order to achieve some of the objectives set forth in column 420, various aspects of a presenter are recorded and analyzed. For example, to ensure optimal performance from the sales rep 412, the communication guidance system can analyze the mic levels and positioning of the camera displaying the sales rep. If the levels are too low or the positioning is off, the system 50 can make a recommendation to adjust those accordingly. The system can analyze the hardware used for the camera and optimize the settings for the camera. The system can also recommend changing lighting or background settings which can be based on the type of presentation to be given, the hardware of the presenter, and the intended audience receiving the presentation. It is known that lighting can affect individuals' moods. Understanding the presenter and if possible, the user's display set up can also help with this analysis. For example, if the presenter uses a dual monitor system, the system can help determine which screen should be the main screen and which screen should be the support screen. The system can also provide recommendations for information or resources used on one screen to be displayed during certain portions of the call on the main screen. In another variation the system can determine whether the user should switch between a sharing mode of showing content as opposed to orally conveying the information.

For example, if the sales rep is citing or listing off a set of statistics they have on their secondary monitor, the system can recommend those statistics become part of a slide that is queued up when that portion of the presentation is to be presented, thereby enabling the sales rep to focus on the accuracy of the statistics as opposed to make appropriate eye contact with the receiver, as the receiver of the presentation will now be viewing the shown statistics on the screen and less focused on where or how the sales rep is looking at that moment. Thus, reducing potential distractions and keeping the receiver's focus, which could be one of the objectives.

Once a practice conference call is completed, the system can also determine the cadence of the user's speech, the flow of the presentation, and analyze if the user missed oral or visible queues where the receiver was trying to engage or respond. For example, sometimes a sales rep may feel they need to finish the content of the section they are presenting prior to asking any questions. The communication guidance system is configured to analyze the receiver's body posture in conjunction with the sounds they emanate to determine if the sales rep missed an opportunity to allow the receiver to speak. Some examples of this include the receiver's mouth being gaped open for a period of time, which could be indicative of them waiting for a pause to say something. Head nodding, hand gestures, or non-verbal sounds, such as those illustrating excitement, confusion, disagreement and so forth can all be analyzed to determine the number of opportunities missed to allow the receiver to respond. The system can also pick up on how many the user or the receiver overtalks or cuts the other person off.

The communication guidance system 50, can be configured in both a pre-call analysis and live analysis aspect. Some of the description below will describe both, but the primary objective of the present application is focus on more of the post-call analysis aspects, which are not necessarily readily accessible during a call, such as percentage of who is talking, reactions to different aspects or tones or cadence of the sales rep and so forth. Additional aspects of the post-call analysis include updating parameters, such as background, lighting, camera angles, and the cadence of speech based on the targeted audience.

Figure 5:
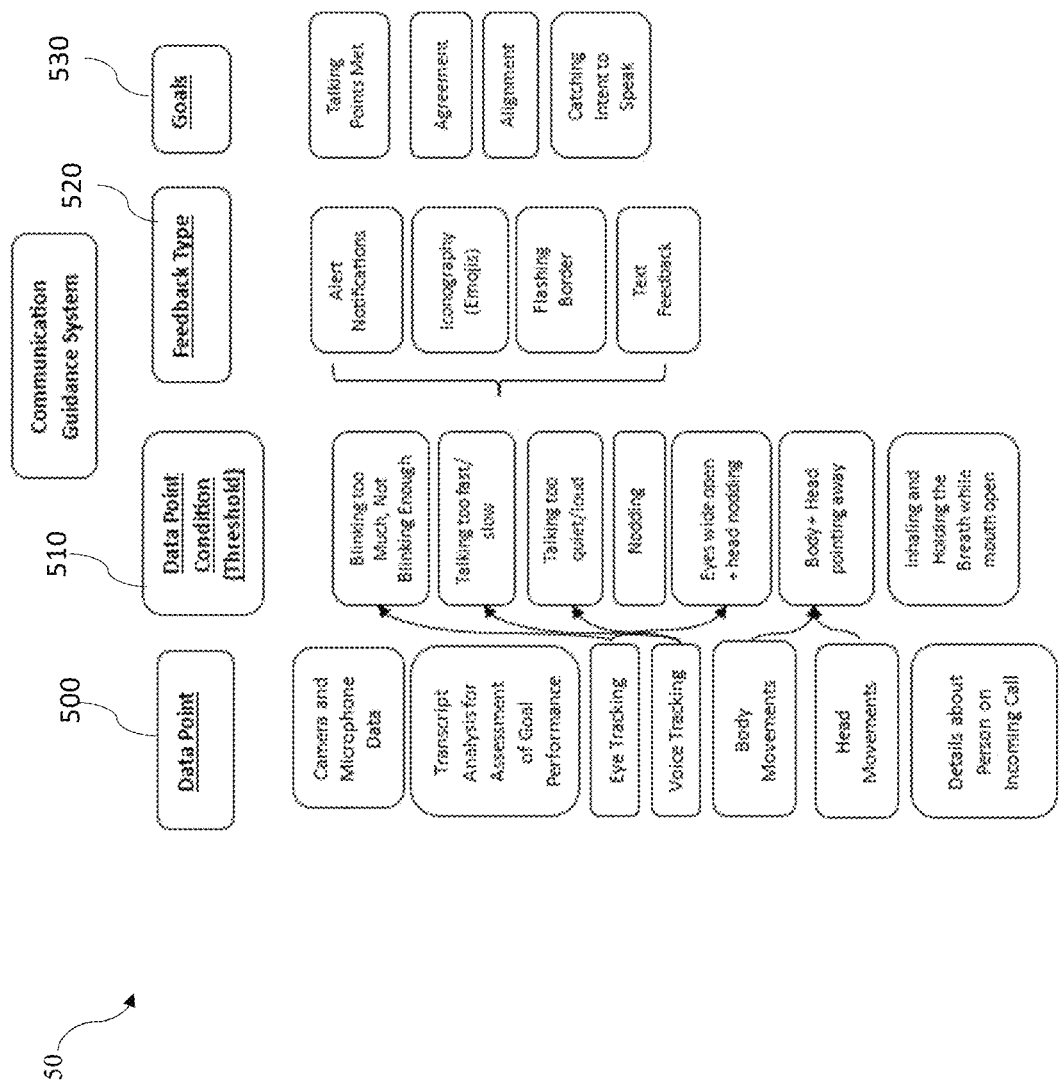
FIG. 5 illustrates a schematic of the communication guidance system portion of FIG. 4.

FIG. 5 illustrates a schematic of the communication guidance system 50 portion of FIG. 4. Under the data point column 500 exists a list of various inputs for the communication guidance system 50 can receive and use for analysis. Many of these inputs can be received by microphones and cameras already associated with a participant's computer system used to make a video conference call. This includes laptops, desktops, smartphones, tablets and so forth. Some of the inputs require an initial analysis such as eye tracking, head and body movements. These movements are initially defined by movement analysis algorithms that can determine the parts of a user's body and the motion each part is performing. This can be seen as the first layer of analysis from the raw camera visual data. Once this initial analysis is done, the movements can then be further analyzed against a threshold, such as those examples illustrated under the data point condition column 510. For example, as shown, the eye tracking data from column 500 can then be further analyzed against a blinking threshold in column 510.

One or more of these conditioned data results under column 520 can be used to provide a type of feedback under column 530, such as some of the feedback indicators noted above. For example, the 'nodding' conditioned data combined with the 'inhaling and holding the breath while mouth open' conditioned data could indicate the participant is very engaged and looking for an opportunity to respond. Thus, the attention indicator could be high, while another feedback indicator might indicate that the presenter needs to stop talking as the participant is ready to respond to the conveyed information. This could come in the form of an emoji or flashing border.

Referring back to column 500, some of the inputs are related to previously acquired details about each of the participants and can even include the data from the presentation about to be given, objectives or goals for the call and so forth. These data points can then be used to identify keywords using natural language processing algorithms to determine if those keywords and phrases have been mentioned and furthermore by which participant. For example, if the presenter conveys one of their talking points, that talking point goal might be achieved and an indicator showing the number/percentage of type of talking points achieved during the presentation be displayed. Furthermore, if the recipient repeated or acknowledged the talking point in a particular manner, such as repeating the talking point, nodding (positively or negatively), then another indicator could be displayed with regards to 'alignment' on that talking point, referring to whether they are aligned or not.

Again, referring to FIG. 6, when the sales rep utilizes the communication guidance system described herein, it allows them, the presenter 602, to check audio and video parameters 612, practice with a colleague, the receiver 604, which can improve retention of the presentation, review talking points, analyze timing, and calibrate layouts 614.

Figure 7:
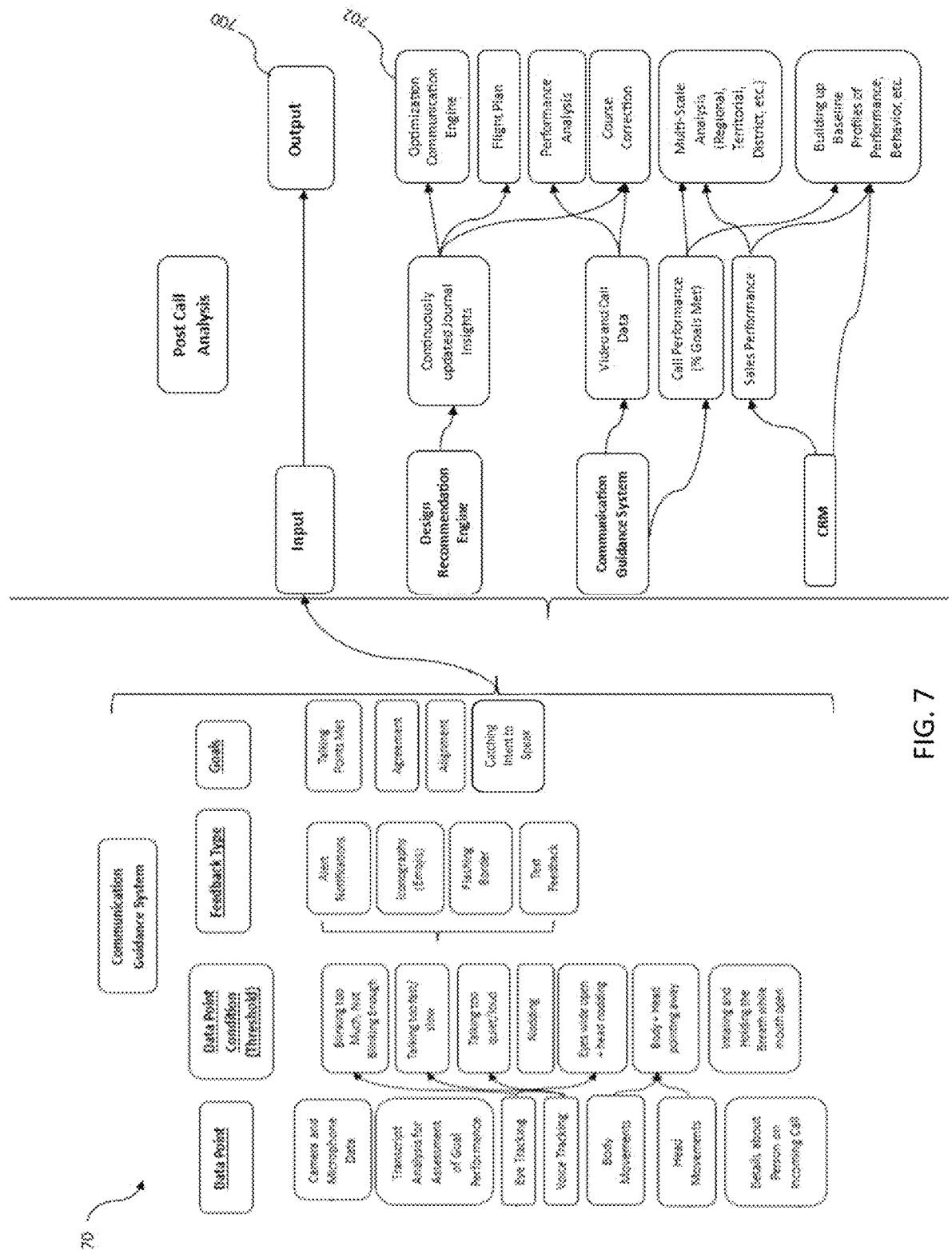
FIG. 7 illustrates a schematic of a methodology for using a communication guidance system to perform post-call analysis.

Using a Communication Guidance System for Post-Call Analysis of a Video Conference Call FIG. 7 illustrates a schematic of a methodology of using a communication guidance system to perform post-call analysis 70. As noted, a natural language processing algorithm 700 can be running during the call and processing in the background to process any spoken text. This NLP algorithm can be configured to recognize all participants and transcribe the dialogue. Every sentence comes with a confidence value and a timestamp. As noted in related applications, this real time recognition of speech can be used to identify the entered talking points with confidence value based on a predetermined threshold to assure that the talking points are not just part of a subordinate clause, but relevant. This NLP algorithm can also be used for post analysis of a call 702, so that a user can readily jump to the various parts of the video. For example, the transcribed dialogue with timestamps can also be aligned with various detected verbal and non-verbal captured data, which is analyzed using a behavioral response algorithm, which can also timestamp and align various behavioral response types, so that the post-analyses can be further sorted and analyzed or reviewed. This could include sorting by all the times during the call when the receiver was excited and replaying those sections or alternatively displaying the text associated with the dialogue that occurred around the times the receiver was excited.

Figure 8:
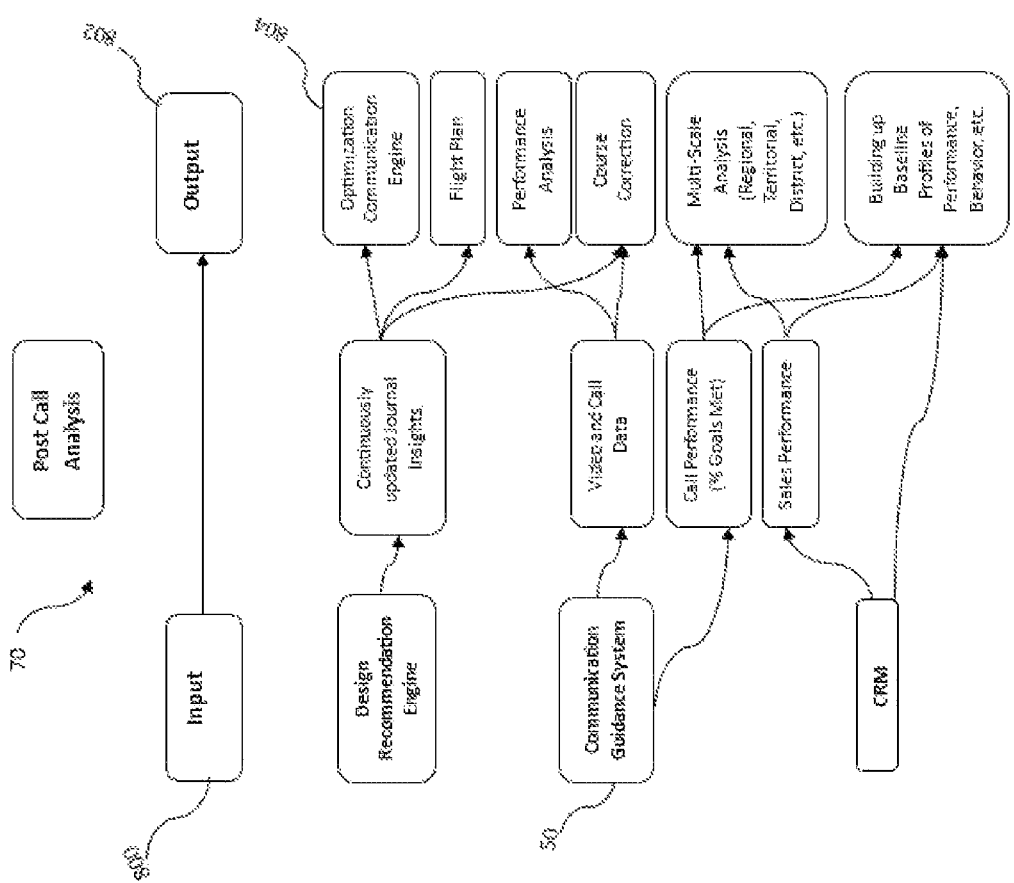
FIG. 8 illustrates a schematic of various aspects of post-call analysis processing and information that can be obtained.

This kind of analysis and others can be done on a single call; however, more analysis can be done when analysis is performed across several video recorded calls where the same presenter or various presenters were presenting a particular presentation. FIG. 8 illustrates a schematic 70 of various aspects of post-call analysis processing and information that can be obtained, including multi-call analysis. Through this multi-call analysis, it can be used to train the design recommendation engine 800, which draws upon continuously updated journal insights into human behavior and responses to everything from tone, to lighting, to gesturing and so forth. When analyzed in combination the communication guidance system 50 can be optimized to more readily ascertain and make recommendations for modifying the current presentation or analyzing future presentations prior to being presented.

The post-call analyses can also include determining to the extent the presenter aligned with their pre-flight or pre-call plan 802. Some of this includes the talking points as noted above, but can further include objectives and goals entered into the system, such as reaching certain engagement or understanding levels.

Also shown in FIG. 8, are analyses related to regional and territories 804. For example, is the presentation being received differently based on the region it is being presented to. It could analyze differences between sales teams, as well differences between individuals and the amount of time as a salesperson or internal training they have received.

All of this information can also be used to generate and build profiles for individual sales team members and even regular recipients, such as doctors and managers who regularly hear the sales presentations, so as to further refine the behavioral recognition aspect and customize the best way to present materials.

Using a Communication Guidance System for Measuring a Return on Investment

Figure 9:
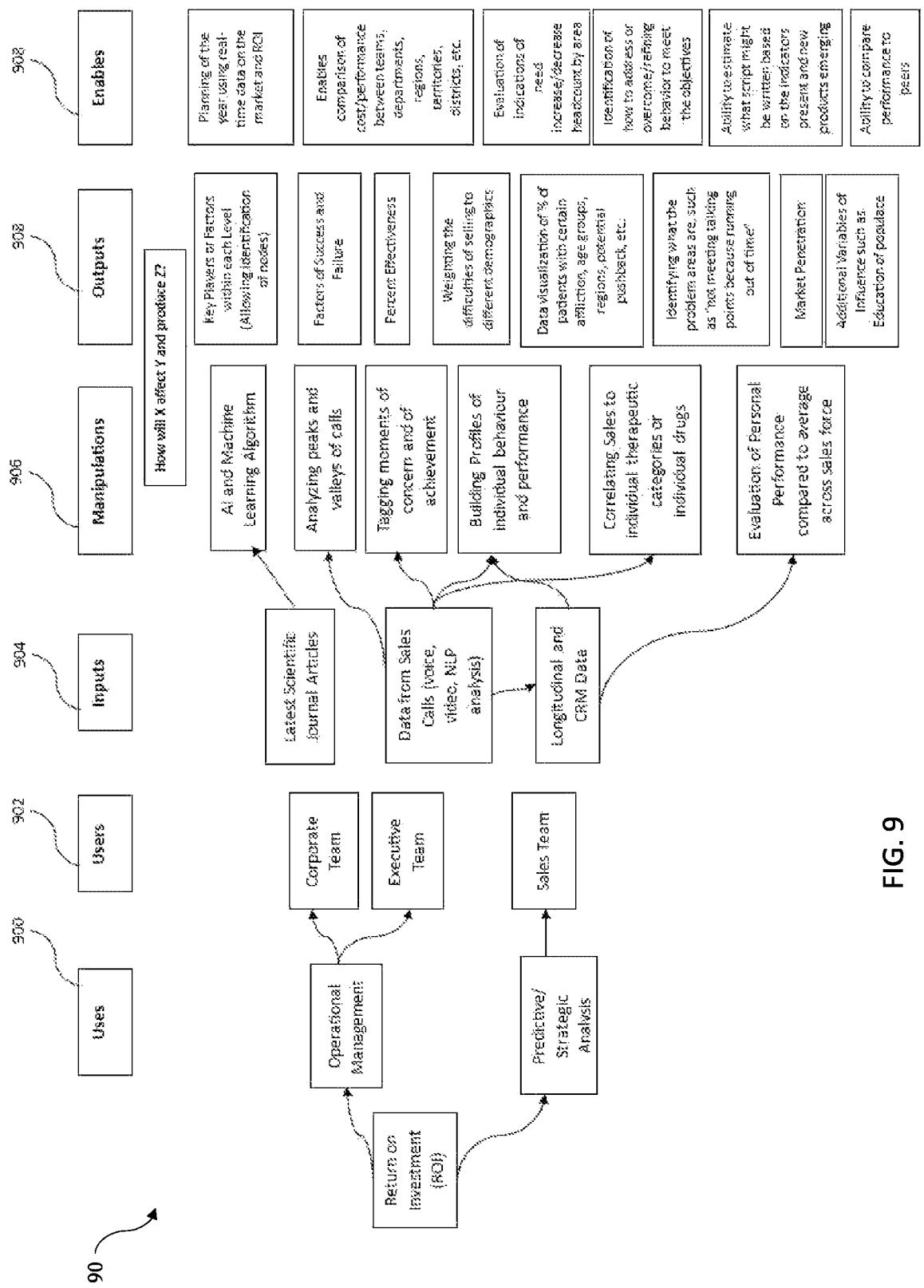
FIG. 9 illustrates a ROI flowchart for various users and uses that can be used in conjunction with a communication guidance system.

FIG. 9 illustrates a ROI flowchart 90 for various uses 9000 and users 902 that can be used in conjunction with a communication guidance system 50. Traditional mechanisms of determining ROI for sales teams, and in particular those selling pharmaceutical or other medical-based products, usually includes gathering data about the number of scripts written per zip code, the number of scripts per pharmacy, as well as doctors and so forth. Some of this data has to be scrubbed and obtained from third party sources. By utilizing the communication guidance system 50 as described above, the ability to capture some of this information via the direct call, in addition to using call data to generate engagement and quality of response metrics can further be used to predict trends in sales. This can then be used to determine the effectiveness of a given campaign, sales team, and how the management team overseeing such is performing, which can then be compared to costs, time, and revenue.

For example, and as shown in the inputs 904 column of FIG. 9, data can be gathered and analyzed from multiple sources including scientific journal data, communication guidance system data, which can be raw or pre-processed, as well as Longitudinal and CRM data. Each of these types of input data can then be manipulated using some of the techniques displayed in the manipulations 906 column of FIG. 9 to produce one of several outputs displayed in the outputs 908 column. Some of these manipulations incorporate data from one or more of the input sources that can be analyzed to generate additional information that can be used as an output or used for additional analyses and combined with other raw or manipulated data to produce an output.

One such example includes using CRM data plus recorded from the communication guidance system based on one or more calls with a particular doctor. This information can be used to build a profile of individual behavior and performance of the doctor. As more and more profiles are built, further analysis can be performed to use the demographic information associated with each profile to determine if there is a difficulty in selling to one demographic over another. The types of questions or concerns that each demographic conveys can also be used, where this information is tagged from each of the video sales calls using the communication guidance system. Then those concerns can be sorted by demographics, which regions or sales teams (or individuals) received those concerns and then compared with sales in a particular region, as well as across several regions. From here, an analysis of the cost spent for the teams and the management supporting each of these teams can be performed to determine one of many ROI metrics.

This information can then be used as part of the predictive analysis for trying to improve the sales or launching a new product into a new area.

System and Method of Updating a Communication Guidance System

Figure 10:
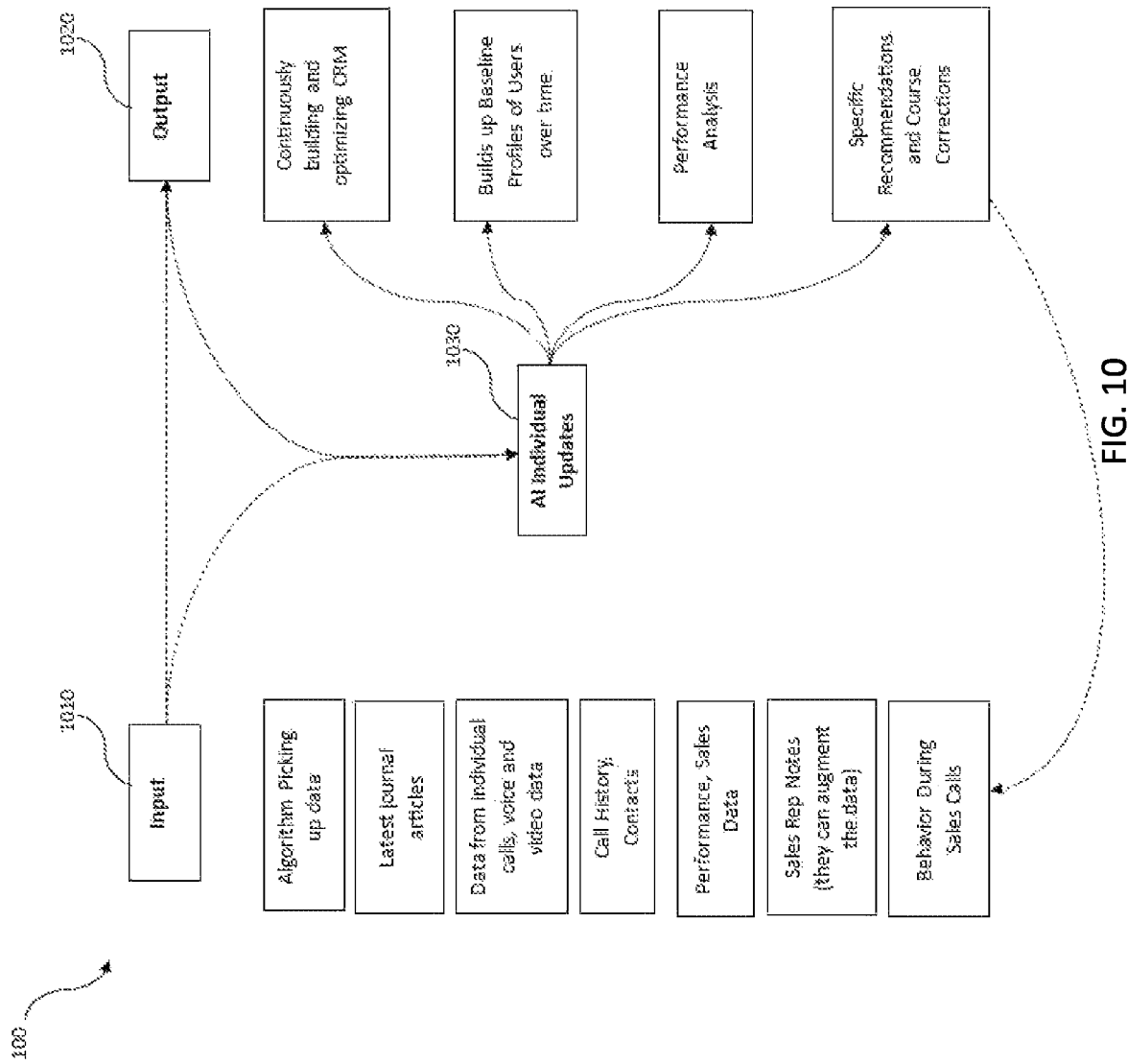
FIG. 10 illustrates a flowchart of updating the content, analysis and weighting of a communication guidance system.

FIG. 10 illustrates a flowchart 100 of updating the content, analysis and weighting of a communication guidance system. As noted, several of the advantages of having a communication guidance system revolve around the ability to capture and analyze several types of data that can be captured during a video-conference sales call, which can be used to determine various behavioral metrics such as determining agreement, confusion, acknowledgment, acceptance, and so forth.

The need for communication guidance system feedback and updating methodology and system can be illustrated in part with the following example. Each recipient has tendencies including verbal and physical that may be unique to that individual. In poker and other games, individuals often try to discern what their opponent's 'tells' are, which include any indications that might tip others as to what kind of hand they are currently holding. In baseball, signals are used and often intercepted to understand the next pitch that is about to be delivered. Thus, it can also be important to understand how the recipient of a sales presentation is thinking, which can be learned through building a user profile and understanding their reactions. To further illustrate, if a recipient recently had back surgery, which causes them to present themselves in a 'stiffer' manner, the positive or negative responses could differ quite a bit from another user, who has not had back surgery or back problems for that matter.

One way of accomplishing this is through building profiles of each of the recipients and updating those profiles with learned information. This can be seen in FIG. 10, where an algorithm receives various inputs 1010 that can be used to update a user's profile, as well as generate other outputs 1020 and updates 10030. An initial recipient baseline can be generated using a database of other recipient behavior and responses. This database can be augmented by updated studies, such as journal articles. As the communication guidance system continues to be used, other information including sales data can be used to confirm the learned positive and negative indicators. Regarding an individual profile, user notes, and previous call analysis can also be used to update the individual user's base profile. Additional information including responding more positively or negatively to a particular sales team member can also be recommended. For example, a particular recipient may have interacted with multiple members of a sales team on the same call and/or across several calls individually or in a combination of calls. The system could make a recommendation based on the responses the user gives each user to make a determination regarding the member of the sales team, best suited to introduce a new product or update, as well as solve any problems, or engage in a number of matters.

System and Database for Generating Behavioral Recommendations

Another aspect related to the embodiments above, is that of generating, updating, validating and using a Levers & Lenses Taxonomy framework that can analyze desired behavioral outcomes to make recommendations on how to achieve those desired outcomes or alternatively, analyze a presentation and predict likely behavioral outcomes.

In the simplest form, the Levers & Lenses Taxonomy framework is comprised of a plurality of lenses, which is a compilation of cognitive factors that affect engagement, as well as a plurality of Levers, which is compilation of industry tools available to use that impact the lenses. These Lenses and Levers can further be arranged by industry, which can further reduce the Levers and Lenses to those pertinent or relative to the particular industry.

This Levers & Lenses Taxonomy framework can be generated by analyzing scientific journal articles and parsing the information into a Levers or a Lenses bucket using a natural language processing algorithm. The following is a sampling of what each of these buckets can include:

Lenses:
- Attention
  - Salience
  - Distraction
  - Expectation
  - Priming
  - Attentional Cues
  - Multitasking
  - Task performance
  - Search
  - Default mode network
  - Task positive network
  - Mind Wandering
  - Vigilance
  - Sustained attention
  - Divided attention
- Mood
  - Savoring
  - Affective Forecasting
  - Excitement
  - positive affect
  - negative affect
  - Remembered enjoyment
  - Consumption enjoyment
  - Emotional arousal
  - Gratification
  - Motivational affordance
  - Pleasant
  - Awe
  - Pride
  - Fear
- Cognitive Processes & Biases
  - Persuasion
  - Storytelling
  - Narrative Transportation
  - Mindset
  - Context
  - Familiarity
  - Willingness to pay
  - Product evaluation
  - Brand loyalty
  - Consumer behavior
  - User behavior
  - Congruence between content and format
  - Decision-making
  - Foot-in-the-door
  - Door-in-the-face
  - Elaboration likelihood model
  - Framing
  - Credibility
- Cognitive Load & Fatigue
  - Participation
  - Cognitive taxation
  - Working memory load
  - Sensory threshold
  - Sensory overload
- Motivation & Behavior Brand loyalty
Consumer behavior
User behavior
Motivation
Engagement
Approach behavior
Avoidance behavior
Purchase intentions
Attitude
Group Dynamics
  social norms
  social motivation
  Participation
  Social appraisal
  Privacy
  Personal space
  In-group favoritism
  Social behavior
  Conformity
  Social pressure
  Group cohesiveness
  Autonomy
  Identity strengthening
  Relationship building
  Groupthink
  Social loafing
Retention
  Chunking
  Brand recognition
  Brand recall
  Scaffolding
  Forgetting curve
  Retrieval practice
  Spaced training
  Recall
  Recognition
  Familiarity
Levers:
  Audience Priming
    Pre-communications
    Agenda
    Pre-show
  Sound
    Sonic branding
    Sound effects
    Music choice
    BPM
    Genre
    Sonic logo
    Sound scaping
  Incentive
    Gamification
    Awards & Badges
    Competition
    Leaderboards
    Payment
  Presentation Design
    Narrative
    Video feed
    Stage Design
    Slide Format
    Presenter Habits
    Virtual Webcam setup
    PowerPoint
    Web based instruction
    Blended learning
    Multimedia learning
    Teaching strategy
  Imagery
    Color
    Faces
    Posing
    Photography
    Illustration
    Visual design
    Branding
  Interactivity
    Interaction design
    Chatroom
    Chatbot
    Group size
  Video format & performance
    Technical quality
    Picture-in-picture
    Stickers
    Speaker framing & set up
    Continuity
    Editing
    Synchronous video
    Dynamic 2d
    Video player
  Speaker
    Interview layouts
    Speaker framing & set up
    Introductions
    Lecture
    Eye contact
    Note placement
    Recap
    Face-to-face
    Charisma
    Presentation skills
  Digital content
    Multimedia
    Online video
    Blog
    Vlog
    Tweet
    Streaming content
    Social media post
    Online courses
    Webpage design
    Advertisement
    Notification
    Smartphone
  Scent
    Scent type
    Diffusion options
    Scent strength
    Ambient scent
  Break
    nature break
    Microbreak
    Lunch break
    Active break
    Passive break
    Break duration
    Types of breaks
  Voice
    Voice training
    Voice Pitch
    Voice Timbre
    Voice Volume
    Breath patterns Tone of voice
Oral presentation
Navigation
Visual markers
User journey
Wayfinding
Crowd density
Workplace culture
Feedback
Positive feedback Performance evaluations
Feedback seeking
Effective feedback
Measurement
Experience sampling
Event reconstruction method
Biofeedback
Wearable
Wristband
Emotional biofeedback
Survey design
Sense of presence inventory
Writing
Advertisement
Op Ed
Sales campaign
Sales call Once a predetermined number of these buckets are filled, they can begin to be validated by using recorded post-call analysis from the communication guidance system to validate the efficacy of individual Lenses and Levers as they relate to a particular industry. For example, if the video-conference sales call is about a new delivery mechanism of a pharmaceutical compound the Levers & Lenses Taxonomy framework could sort through what available Lenses and Levers buckets that are available with that industry and then analyze the recorded video-conference sales call based on those. If one of the Lenses is Attention with several sub-Attention elements that could be cross-analyzed with the Lever Presentation Design and each of the Presentation Design sub-elements to validate based on the recipient(s) response to each of those sub-elements. This analysis can then be used to update those particular Lenses and Levers for that industry.

As more of the Lenses and Levers are validated through the recorded video conference data, a weighting algorithm can be developed to determine whether updates to other Lenses and Levers that have not been validated should be made.

Upon establishing the Levers and Lenses Taxonomy framework, a user can now input desired behavioral outcomes for a particular industry and the framework can generate a recommendation on the types of Levers to use, as well as the impact on various Lenses.

Figure 11:
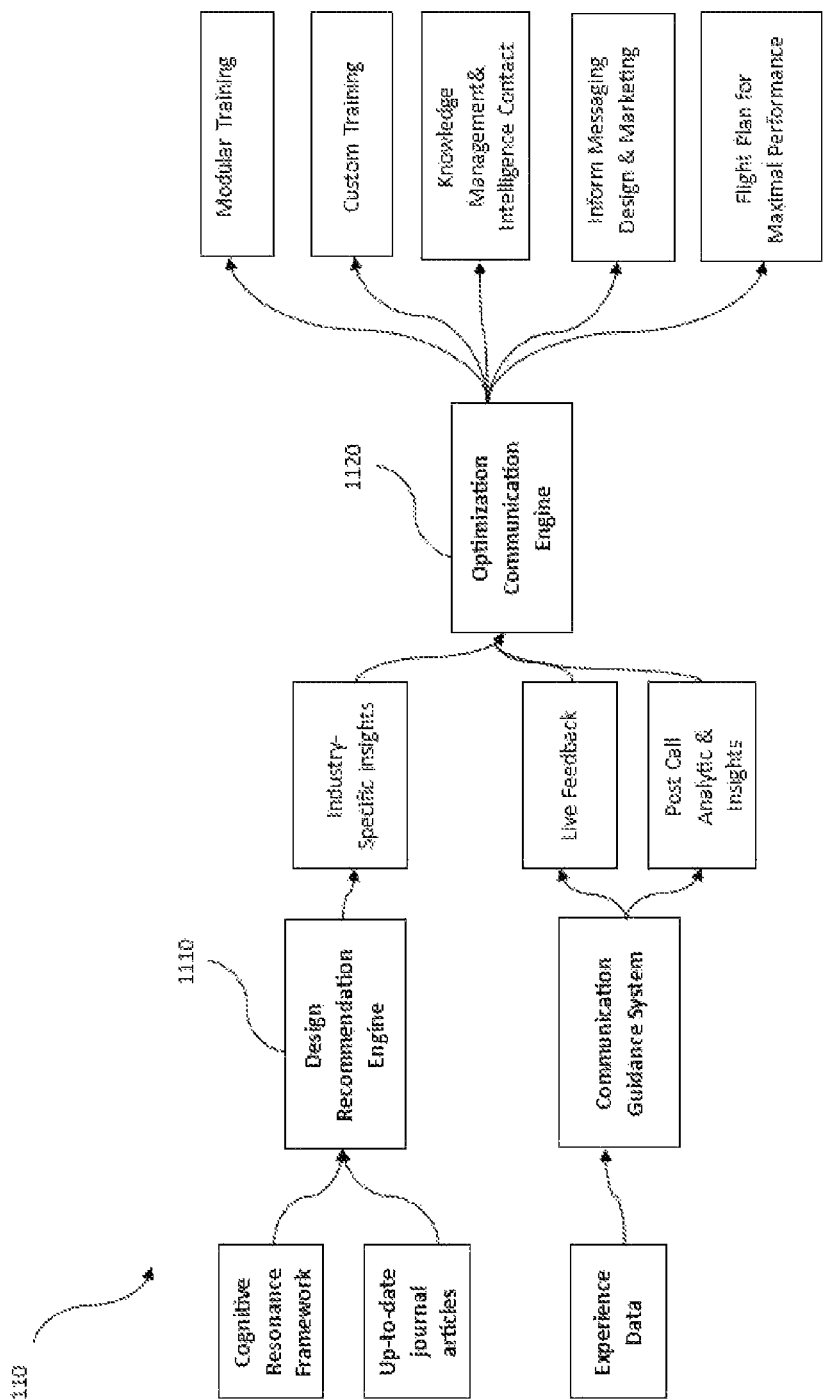
FIG. 11 illustrates a flowchart of a methodology to generate KPIs and recommendations for several areas related to video-conference calls.
Figure 12A:
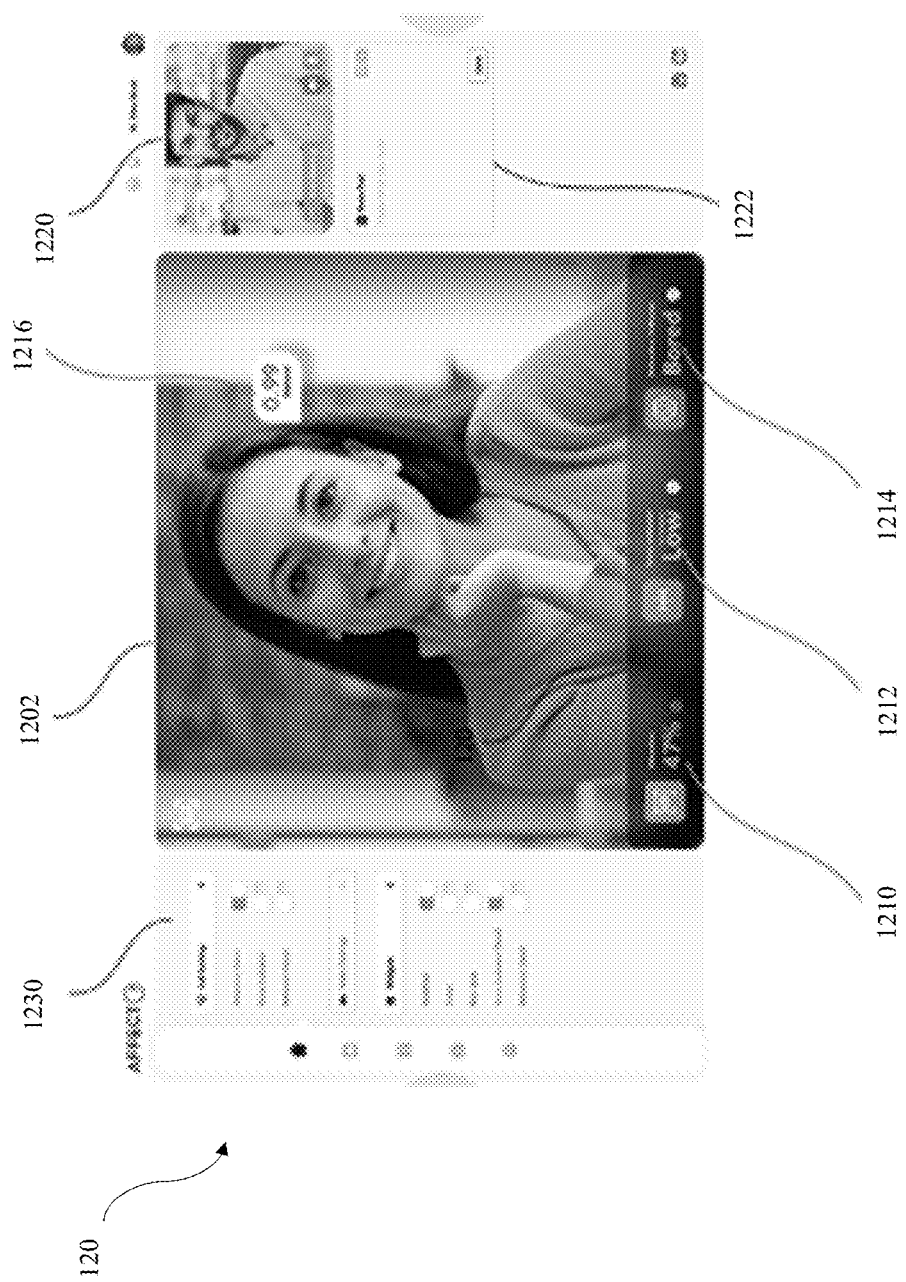
FIGS. 12A-H illustrate various views of a real-time feedback interface for use with a video conference meeting.
Figure 12B:
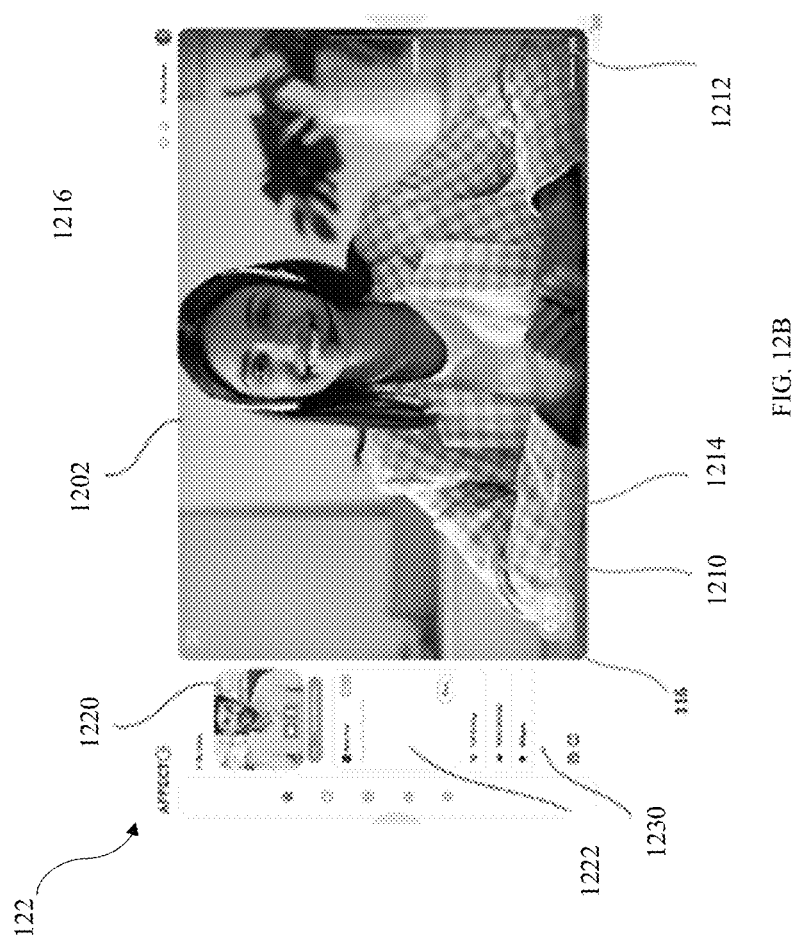
Figure 12C:
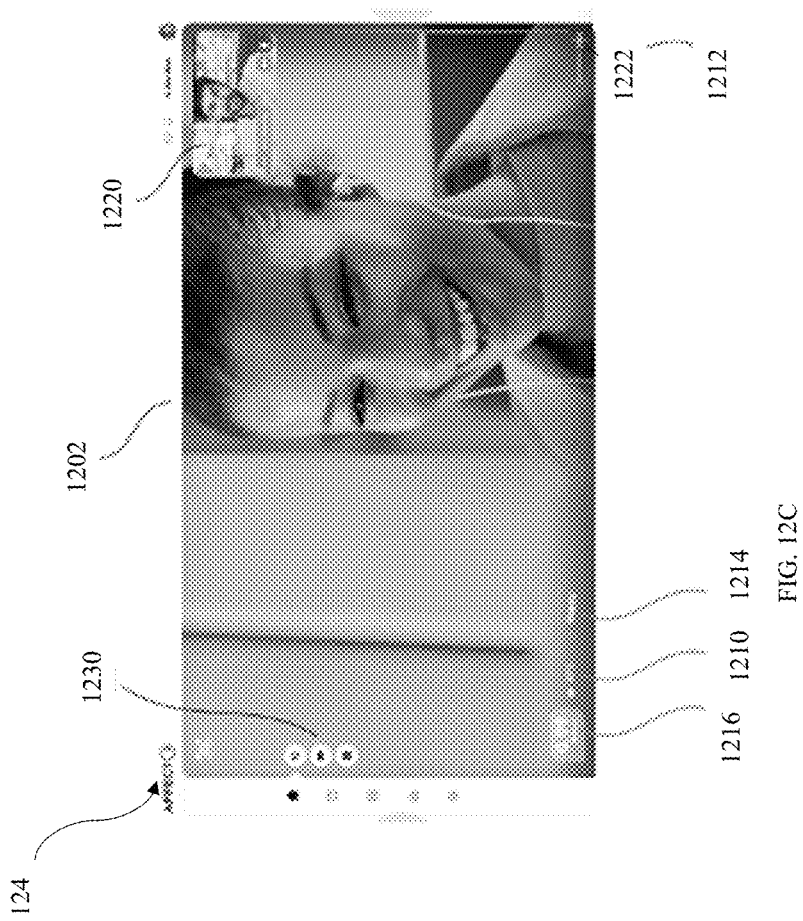
Figure 12D:
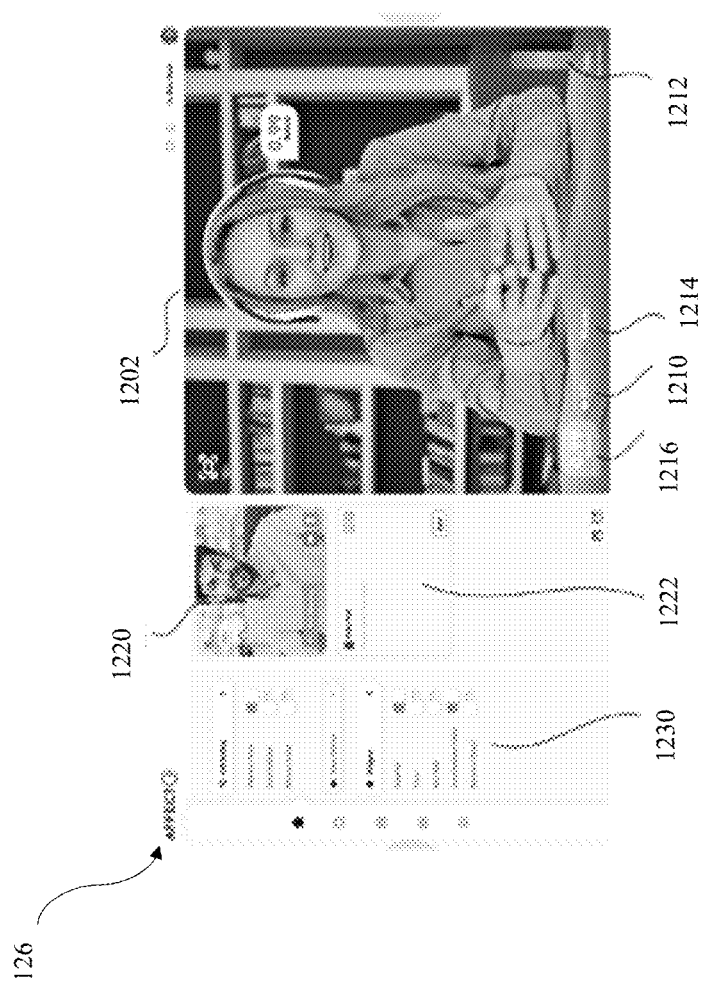
Figure 12E:
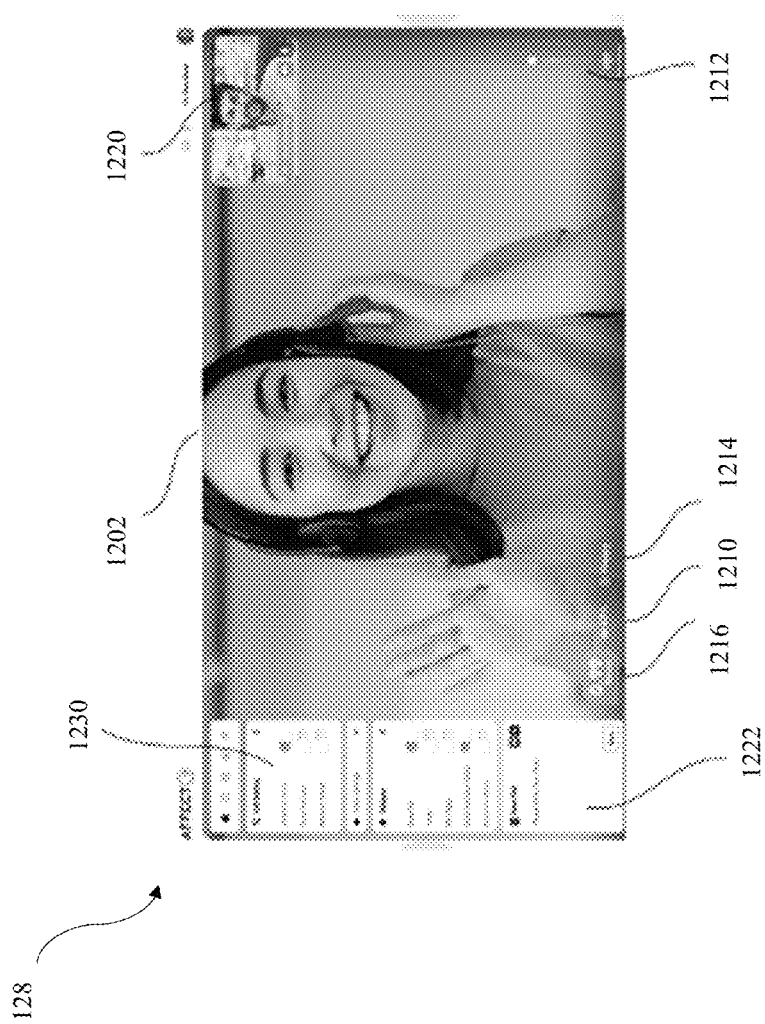
Figure 12F:
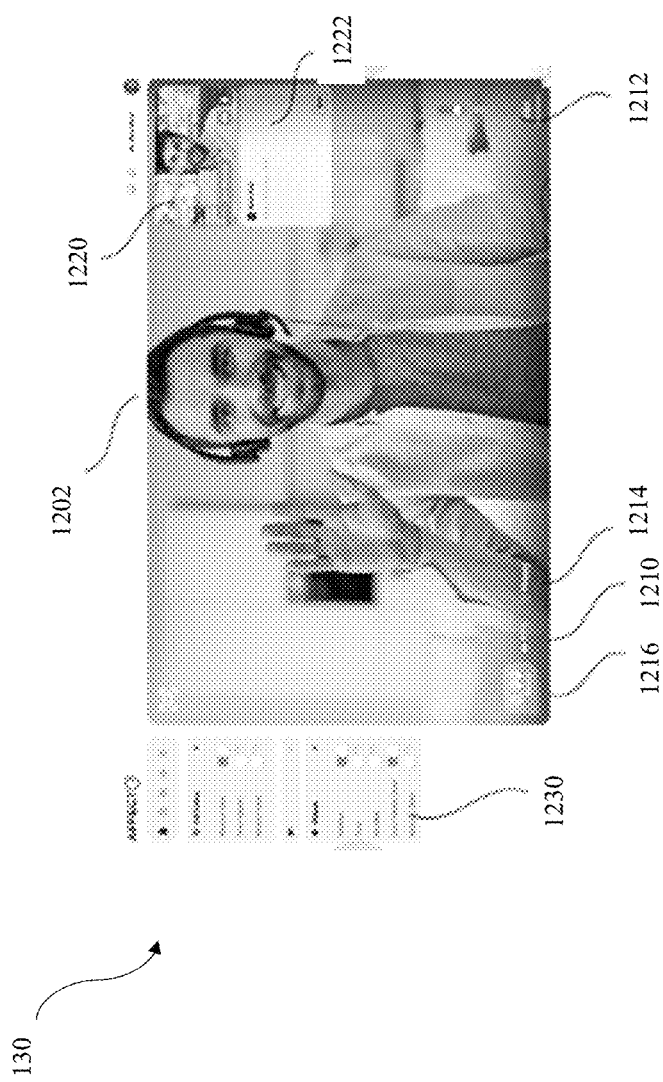
Figure 12G:
Figure 12H:
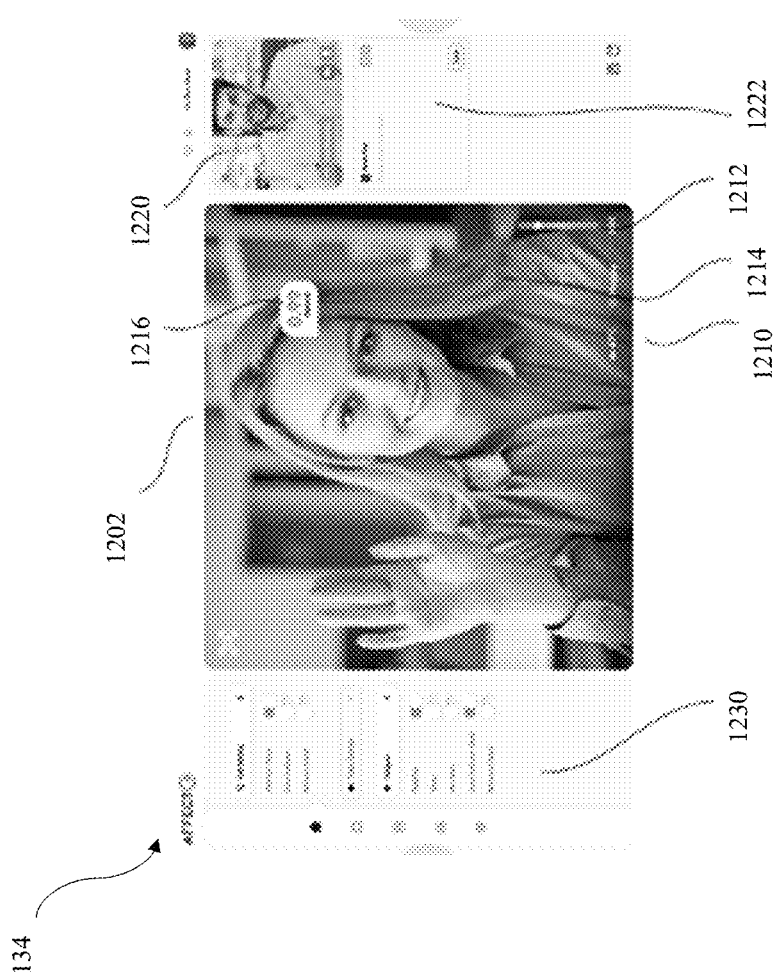

System and Method for Providing Video Call Optimization Recommendations and Sales Team Optimization FIG. 11 illustrates a flowchart 110 of a methodology to generate KPIs and recommendations for several areas related to video-conference calls. As noted, a communication guidance system can be used to understand a variety of behavioral aspects from a recipient and help with tracking various goals and objectives. However, additional key performance indicators (KPIs) can be generated using an optimization communication engine as shown in FIG. 11. These KPIs can be related to modular training, custom training, knowledge management and intelligence contact, design and marketing messaging, as well as maximizing flight plans (flow of a presentation).

How this is accomplished is a design recommendation engine analyzes journal articles and a cognitive resonance framework to generate industry-specific insights. The cognitive resonance framework can be comprised of a plurality of a database that is automatically vetted against industry know-how, latest journal research, and experience data that can be gathered using the communication guidance system. This database can be comprised of a plurality of levers and lenses, where the levers are industry tools available to users and lenses are cognitive factors that affect engagement, both of these can be further defined by a specific industry. For example, the architecture industry is going to have different industry tools available than the pharmaceutical industry. Similarly, the lenses or cognitive factors that affect engagement for each might differ based on the industry norms. Once compiled, vetted and updated, the design recommendation engine can utilize the cognitive resonance framework and latest journal research to generate industry-specific insights. This information can be combined with post-call analytics as well as live-feedback from the communication guidance system and used by the optimization communication engine to generate various KPIs.

In one example, the voice and speed of a trainer used in combination with periodic breaks and background lighting and colors affects the engagement levels of trainees resulting in a positive experience, but reduces retention knowledge. Thus, the optimization communication engine can define KPIs based on goals or objectives to be met. For example, starting the training course or a particular module off in a way that increases retention or likelihood of finishing the course, while changing up various aspects of the training to move towards retention of knowledge later on in the course. Building brand loyalty might also be an objective of the training and understanding the best tools to utilize for building brand loyalty can be identified.

In one use of the optimization communication engine, the user can enter an objective, such as increasing brand loyalty, and the engine can generate KPIs with regards to how to best accomplish. Furthermore, if more than one objective is to be achieved, the engine can generate a flight plan, which acts as a guide for a particular presentation. This flight plan can include guideposts of how to accomplish the various objectives and the KPIs associated with optimizing the ability to do so.

Another way of using the optimization communication engine is that of analyzing an individual member's performance, such as a sales team. The system can utilize the performance of other sales team members, broken down by regions and products, as well as a number of other factors including years of experience, amount of training, supervisory team, salary and so forth. Once the analysis of performance data is generated, the system can pick one or more of the measured metrics to determine how to improve. This is accomplished by the optimization communication engine taking into consideration exogenous factors or causes, which can include the recipients of the sales call, the region, the demographics of the served population, weather and time of year, as well as internal factors or causes, which could include workspace environment, training, administrative support, salary, and so forth to identify specific areas where the individual could improve upon. For example, if the individual is selling cardiac drugs, where it is determined that their knowledge of competitive cardiac drugs and their effects is limited, then a recommendation could be made to be trained on or to do further research on competitive cardiac drugs. This could be identified in comparing how the individual sales member responds to a question received about competitive products, where that is compared and contrasted with others responding to similar questions and how the recipients in those situations were satisfied or not with the response. The engine could even generate a list of facts around the competitive cardiac drugs through scraping responses from other sales team members during video conference calls as a starting point.

Another way the engine could make a recommendation is by analyzing the appropriate sales team members and their styles against recipients and their behavioral profiles. In this way, the engine could make a recommendation on who to call upon a particular recipient next and generate guideposts or a flight plan for how that call should be accomplished based in part on that recipient's profile, and the industry specific insights generated from the design recommendation engine.

System and Method of Real-Time Behavioral Feedback

This disclosure relates generally to a communication guidance system 30 and associated methods which is designed to provide behavioral and other types of feedback based on live or recorded video meeting presentations.

FIGS. 12A-H illustrate various views of real-time feedback interfaces 120A-H for use with a video conference meeting. The real-time feedback interfaces 120A-H could be a standalone interface or alternatively the interfaces could be integrated into other current video conference platforms. The real-time feedback interfaces 120A-H currently shown are meant to convey the view from the presenter or purveyor view. As shown, there is a main video area 1202 to see the recipient or other party the presenter or user is communicating with. Viewing section 1220 could be a view of the user or presenter performing the video conference call. A control settings and features section 1230 is provided, which can also be minimized in favor of a larger or less cumbersome viewing experience. Similarly, a note section 1222, which can enable note taking during the call or display talking points for the call. Feedback indicators 1210, 1212, 1214, and 1216 can be configured in various positions and formats as illustrated through the various interfaces 120A-H. For example, the indicators can be in the form of numbers, percentages, words, colors, gradient scales or a combination thereof. The indicators can even increase or decrease in intensity, as well as flash at given times.

Some of the feedback indicators can include an attention indicator 1210, a voice indicator 1212, a behavioral indicator 1214 and a "natural indicator" 1216. The attention indicator 1210 can analyze using the various data inputs described in FIG. 14 to indicate a level of attention the recipient is providing during the call. This level can fluctuate based on the data inputs associated with the recipient. This attention indicator can be a rolling indicator where it is constantly being updated. An overall attention indicator at the end of the call can also be provided.

Figure 14:
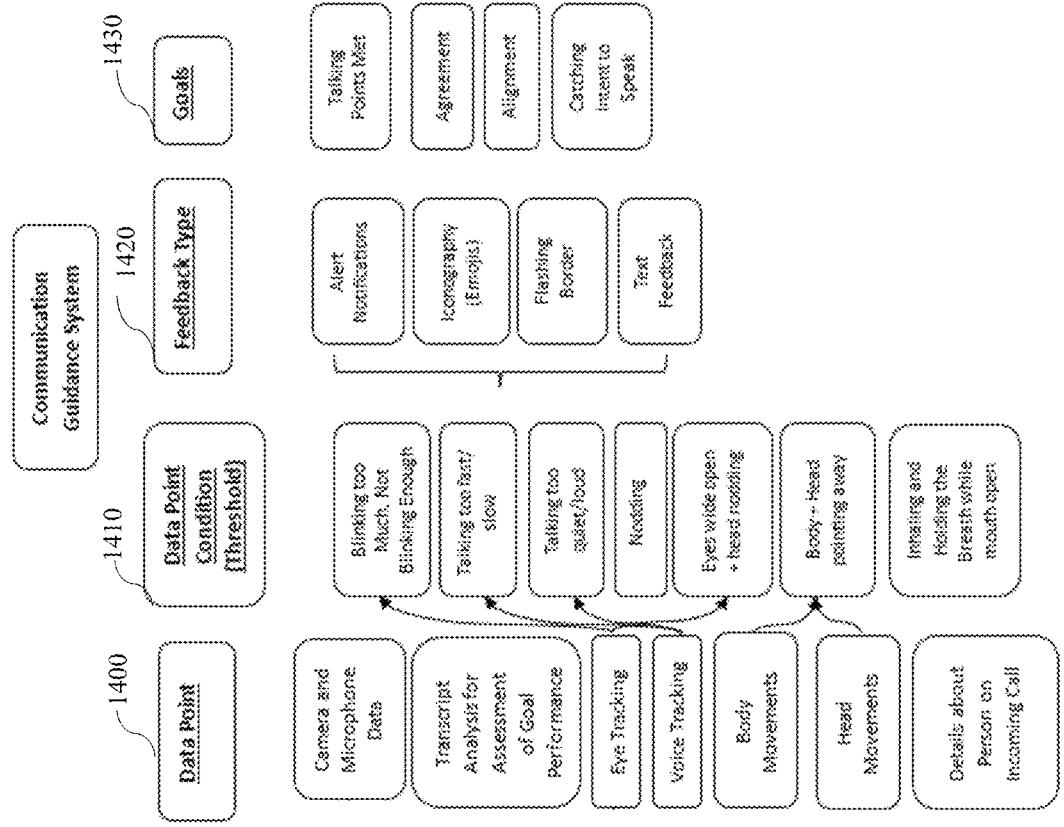
FIG. 14 illustrates an overview of the Communication Guidance system and methodologies.

The voice indicator 1212 can analyze using the various data inputs described in FIG. 14 and in particular voice levels, fluctuations and so forth to indicate a level of interest the recipient is providing during the call. Similar to the other feedback indicators this can also fluctuate throughout the video conference call. This indicator shown is primarily focusing on analysis as a result of the recipient's voice. However, a separate user/presenter voice feedback indicator can focus on how well the presenter's voice is being received. Again, the voice indicator 1214 like the others can be a rolling or changing indicator where it is constantly being updated. An overall voice indicator analysis can be provided at the end of the call.

The behavioral indicator 1214 can analyze using the various data inputs described in FIG. 14 to indicate a type of behavior response the recipient is providing during the call. This response type can also fluctuate based on the data inputs associated with the recipient. This behavioral indicator 1114 can be a rolling or changing indicator where it is constantly being updated. An overall behavioral analysis can be provided at the end of the call.

The natural indicator 1116 can analyze the qualia of emotion from the recipient, such as natural vs neutral. Other variables that play into this natural indicator would be happy, sad, angry, bored, and allow the presenter to overcome or meet the needs of the recipient during the call.

Figure 13:
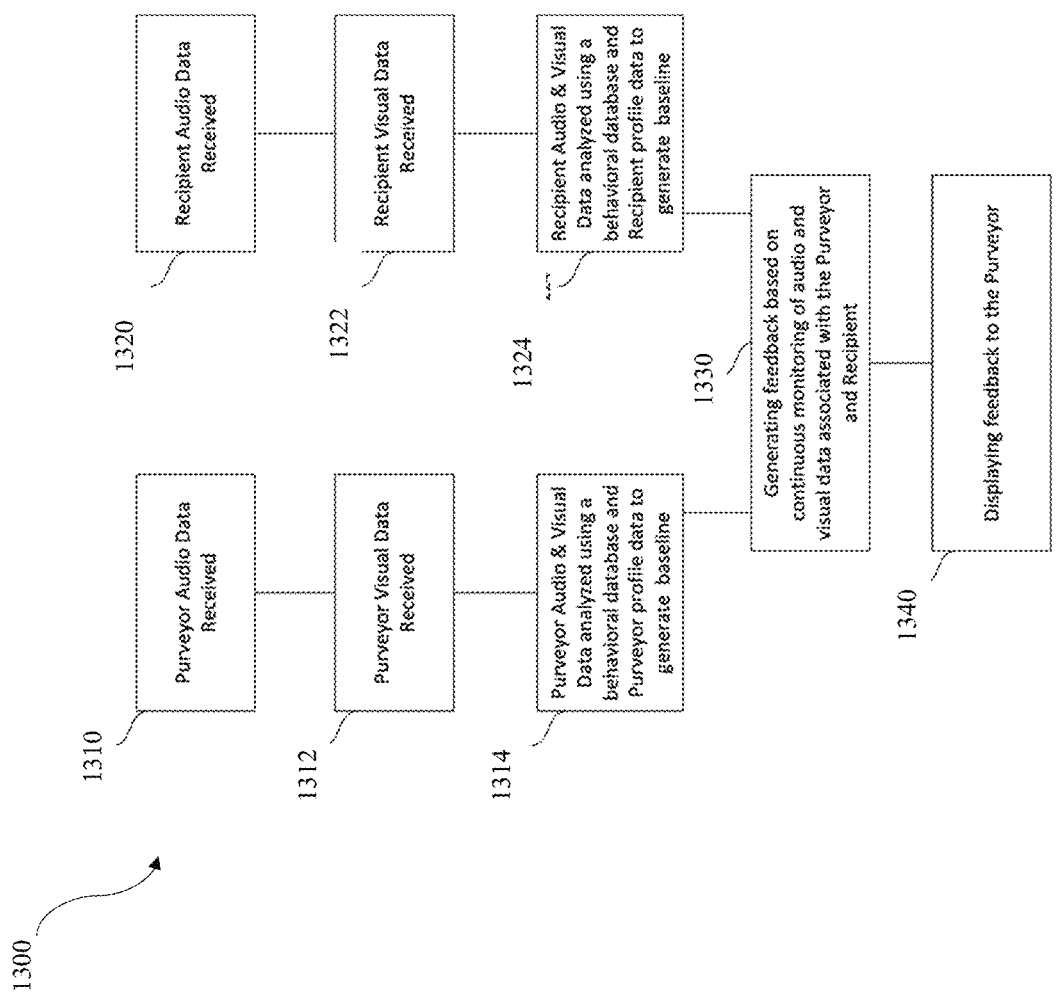
FIG. 13 illustrates a flowchart of receiving various types of data from those engaged in a video conference call, analyzing the data and displaying feedback based on the analyzed data.

FIG. 13 illustrates a flowchart 130 of receiving various types of data from those engaged in a video conference call, analyzing the data and displaying feedback based on the analyzed data. As shown, both audio 1310 and visual data 1312 are collected from the purveyor or presenter of the video conference call. Similarly, audio 1320 and visual data 1322 are collected from the recipient. As this information is being collected, it starts getting analyzed by a behavioral database in steps 1314 for the purveyor/presenter and 1324 for the recipient. The information gathered and analyzed for each participant is used to generate a baseline for each. Once the baseline is generated, the information can be combined from both participants to generate feedback indicators. These feedback indicators can then be displayed, such as those previously discussed in FIGS. 12A-HA-H. It should be understood that these are not the only types of indicators that can be generated based on the audio and visual data inputs from the participants.

FIG. 14 illustrates an overview of the Communication Guidance system 30 and methodologies. Under the data point column 1400 exists a list of various inputs for the communication guidance system 140 can receive and use for analysis. Many of these inputs can be received by microphones and cameras already associated with a participant's computer system used to make a video conference call. This includes laptops, desktops, smartphones, tablets and so forth. Some of the inputs require an initial analysis such as eye tracking, head and body movements. These movements are initially defined by movement analysis algorithms that can determine the parts of a user's body and the motion each part is performing. This can be seen as a first layer of analysis from the raw camera visual data. Once this initial analysis is done, the movements can then be further analyzed against a threshold, such as those examples illustrated under the data point condition column 1410. For example, as shown, the eye tracking data from column 1400 can then be further analyzed against a blinking threshold in column 1410.

One or more of these conditioned data results under column 1420 can be used to provide a type of feedback under column 1430, such as some of the feedback indicators noted above. For example, the 'nodding' conditioned data combined with the 'inhaling and holding the breath while mouth open' conditioned data could indicate the participant is very engaged and looking for an opportunity to respond. Thus, the attention indicator could be high, while another feedback indicator might indicate that the presenter needs to stop talking as the participant is ready to respond to the conveyed information. This could come in the form of an emoji or flashing border.

Referring back to column 1400, some of the inputs are related to previously acquired details about each of the participants and can even include the data from the presentation about to given, objectives or goals for the call and so forth. These data points can then be used to identify keywords using natural processing language algorithms to determine if those keywords and phrases have been mentioned and furthermore by which participant. For example, if the presenter conveys one of their talking points, that talking point goal might be achieved and an indicator showing the number/percentage of type of talking points achieved during the presentation be displayed. Furthermore, if the recipient repeated or acknowledged the talking point in a particular manner, such as repeating the talking point, nodding (positively or negatively), then another indicator could be displayed with regards to 'alignment' on that talking point, whether they are aligned or not.

Various embodiments and options have been described herein that are exemplary of the present invention; one skilled in the art will recognize additional embodiments within the spirit and scope of the invention. Modification and variations can be made to the disclosed embodiments without departing from the scope of the disclosure. Those skilled in the art will appreciate that the applications of the embodiments disclosed herein are varied. Accordingly, additions and modifications can be made without departing from the principles of the disclosure. In this regard, it is intended that such changes would still fall within the scope of the disclosure. Therefore, this disclosure is not limited to the particular embodiment as shown but is intended to cover modifications within the spirit and scope of the disclosure.

What is claimed is:

1. A communication guidance system, the system comprising: a non-transitory computer-readable medium;
   an input recognition interface; and
   processing circuitry operably connected to the non-transitory computer-readable medium and the input recognition interface, the processing circuitry being configured to perform the following tasks:
      receive audio and video data from a user and a receiver;
      analyze, at least in part based on the audio and video data from the user and the receiver using one or more movement analysis algorithms, a communication quality of the user; and
      provide at least one recommendation based on the analysis; and
   wherein the system is further configured to analyze said audio and video data to identify a number of opportunities missed by the user to allow the receiver to speak.

2. The system of claim 1, wherein the at least one recommendation includes any of: changing the cadence of speech, monitoring appropriate gestures, modifying screen, camera or audio equipment, updating background or lighting.

3. A method of analyzing a presentation comprising the steps of:
   receiving audio and video data from a user and a receiver;
   analyzing, at least in part based on the audio and video data using one or more movement analysis algorithm, a communication quality of the user;
   providing at least one recommendation based on the analysis; and
   further analyzing said audio and video data to identify a number of opportunities missed by the user to allow the receiver to speak.

4. The method of analyzing a presentation of claim 3 further comprising the step of sorting the audio and video data by region or territory.

5. The method of analyzing a presentation of claim 4 further comprising the step of comparing aggregated analyzed audio and video data associated with each region or territory to each region or territory.

6. The method of analyzing a presentation of claim 5 further comprising the step of modifying the presentation for any region or territory that is a statistically significant range lower than a predetermined threshold.

7. The method of analyzing a presentation of claim 6, wherein the statistically significant range is at least one standard deviation away from the predetermined threshold.

8. The system of claim 1, wherein the analysis is a pre-call analysis and wherein the user and receiver are engaged in a practice conference call.

9. The system of claim 1, wherein the system is further configured to analyze said audio and video data to identify, via the one or more movement analysis algorithms, at least one of: a mouth of the receiver being gaped open for a period of time, the receiver nodding, and/or one or more hand gestures.

10. The method of analyzing a presentation of claim 3, further comprising the step of, before said recording:
    generating a database comprising a compilation of cognitive factors that affect engagement, and industry tools available to impact engagement;
    validating using the recorded audio and visual data an efficacy of the cognitive factors and industry tools for a specific industry pertaining to the receiver.

* * * * *